US007027830B2

(12) United States Patent
Muraoka

(10) Patent No.: US 7,027,830 B2
(45) Date of Patent: Apr. 11, 2006

(54) RADIO BASE STATION, MOBILE STATION, RADIO RECEIVING APPARATUS, SIR ESTIMATION METHOD, TRANSMISSION POWER CONTROLLING METHOD AND PROGRAM

(75) Inventor: Shinya Muraoka, Tokyo (JP)

(73) Assignee: NEC Corporation, Tokyo (JP)

( * ) Notice: Subject to any disclaimer, the term of this patent is extended or adjusted under 35 U.S.C. 154(b) by 331 days.

(21) Appl. No.: 10/295,877

(22) Filed: Nov. 18, 2002

(65) Prior Publication Data

US 2003/0095511 A1 May 22, 2003

(30) Foreign Application Priority Data

Nov. 21, 2001 (JP) ............................. 2001-356054

(51) Int. Cl.
*H04Q 7/20* (2006.01)
(52) U.S. Cl. ..................... 455/522; 455/69; 455/127.1; 370/318
(58) Field of Classification Search ................ 455/522, 455/69, 67.11, 226.1, 226.2, 127.1
See application file for complete search history.

(56) References Cited

U.S. PATENT DOCUMENTS

| 5,604,766 | A | * | 2/1997 | Dohi et al. | .................. | 375/130 |
| 6,404,826 | B1 | * | 6/2002 | Schmidl et al. | ............. | 375/340 |
| 6,628,924 | B1 | * | 9/2003 | Miyamoto | .................... | 455/69 |
| 6,834,197 | B1 | * | 12/2004 | Nakahara et al. | ........... | 455/522 |
| 6,873,857 | B1 | * | 3/2005 | Kanemoto et al. | .......... | 455/522 |
| 2004/0008639 | A1 | * | 1/2004 | Yano et al. | ................. | 370/318 |

FOREIGN PATENT DOCUMENTS

| EP | 0 961 417 A2 | 12/1999 |
| EP | 1 063 788 A1 | 12/2000 |
| EP | 1143757 A1 * | 10/2001 |
| JP | 2000-78644 | 3/2000 |
| JP | 2001-127702 | 5/2001 |
| WO | WO 01/08322 A1 | 2/2001 |
| WO | WO 01/52425 A2 | 7/2001 |

OTHER PUBLICATIONS

European Search Report dated Jul. 2, 2004.
Japanese Office Action dated Jan. 5, 2005, with partial English translation.

* cited by examiner

*Primary Examiner*—Tilahun Gesesse
(74) *Attorney, Agent, or Firm*—McGinn IP Law Group, PLLC

(57) ABSTRACT

To implement highly accurate SIR estimation and thereby perform stable transmission power control immediately after starting user communication. A common control circuit has an ISSI value of each sector stored therein. On starting the user communication, the common control circuit outputs to a communication channel circuit for starting the communication the ISSI value corresponding to a sector where the communication is started of the stored ISSI values. The communication channel circuit performs the SIR estimation of a received signal by using the ISSI value and also performs the user communication. The communication channel circuit stores the ISSI value on finishing the communication in the common control circuit in the case where the communication is finished.

15 Claims, 17 Drawing Sheets

US 7,027,830 B2

RADIO BASE STATION, MOBILE STATION, RADIO RECEIVING APPARATUS, SIR ESTIMATION METHOD, TRANSMISSION POWER CONTROLLING METHOD AND PROGRAM

BACKGROUND OF THE INVENTION

1. Field of the Invention

The present invention relates to a radio system comprised of radio transmitting apparatuses and radio receiving apparatuses such as a mobile communication system constituted by a plurality of mobile stations and radio base stations, and in particular, to an SIR estimation method of, from a desired signal level and an interference signal level of a received signal, acquiring an SIR value of the received signal, and a transmission power controlling method for controlling a transmission power of the radio transmitting apparatus by using the SIR value measured by the SIR estimation method.

2. Description of the Prior Art

In recent years, CDMA (Code Division Multiple Access) communication mode which is good at handling interference and hindrance is receiving attention as a communication mode to be used for a mobile communication system. In the CDMA communication mode, a transmitting apparatus spreads a user signal by using a spreading code and transmits the user signal. Then, a receiving apparatus despreads the received signal by using the same spreading code to obtain the original user signal. A plurality of transmitting apparatuses spread user signals by using different spreading codes, and each of receiving apparatuses can specify the communication by selecting the spreading code to be used when despreading the received signal. Therefore, the same frequency band can be used for a plurality of communications.

In the CDMA communication mode, if spreading codes to be used in mobile stations are mutually completely orthogonal, signals transmitted by the stations do not interfere with other signals. However, it is difficult to keep all the spreading codes to be used completely orthogonal, and so each spreading code does not become completely orthogonal but has correlation components between it and other codes in reality. Thus, these correlation components become interference components for the communication, which are a deterioration factor of the communication quality. The interference components are generated due to such a factor, so that they increase as the number of communications increases. For that reason, if transmission powers of all mobile stations are a fixed value, there arises a situation wherein a signal from the mobile station near a base station is so strong that it significantly interferes with the signal from a distant mobile station, which is a so-called near-far problem. Therefore, transmission power control is performed in order to set the transmission power of an up link from each of the mobile stations to the base station at an appropriate value.

Transmission power control (hereafter, referred to as TPC) will be described. One station measures an SIR (Signal to Interference power Ratio) based on a received signal from the other station, and then compares the measured SIR to a predetermined SIR (hereafter, referred to as a target SIR ). In the case where the measured SIR is smaller than the target SIR, the other station is instructed to increase the transmission power, and in the case where the measured SIR is larger than the target SIR, it is instructed to decrease the transmission power. To perform measurement of the SIR, a desired signal level (hereafter, referred to as RSSI (received signal strength indicator)) of each path after despread is divided by an interference signal level (hereafter, referred to as ISSI (interference signal strength indicator)), and then the SIRs of all the paths are added up. The ISSI is the sum of the noise inputted to an antenna, other user signals and noise generated in the station.

FIG. 11 shows a block diagram of a radio base station 90 and a mobile station 94 for performing such transmission power control. In addition, a data format transmitted and received between the base station and the mobile station is shown in FIG. 12. Data 1 and data 2 in FIG. 12 are user data respectively, and TPC bits are a transmission power control request from the base station 90 or the mobile station 94.

The radio base station 90 is comprised of a transmitting portion 91, a receiving portion 92 and an SIR measuring portion 93, and the mobile station 94 is comprised of a transmitting portion 95, a receiving portion 96 and an SIR measuring portion 97.

At the radio base station 90, the receiving portion 92 receives the signal from the mobile station 94, and the SIR measuring portion 93 measures the SIR of the received signal and determines whether or not the measured SIR is a preset target SIR or more. And in the case where the measured SIR is smaller than the target SIR, the SIR measuring portion 93 sends to the transmitting portion 91 TPC information for requesting an increase in transmission power, and in the case where the measured SIR is the target SIR or more, the SIR measuring portion 93 sends to the transmitting portion 91 the TPC information for requesting a decrease in transmission power. The transmitting portion 91 transmits to the mobile station 94 data including the TPC information as the TPC bits. And the mobile station 94 having received the signal from the radio base station 90 decreases or increases the transmission power of the transmitting portion 95 based on the TPC bits included in the received signal so that the transmission power control is performed. While it was described by using the case of transmitting the TPC bits from the radio base station 90 to the mobile station 94, the same method is also used in the case of transmitting the TPC bits from the mobile station 94 to the radio base station 90.

FIG. 13 shows a configuration of the conventional radio base station for performing such transmission power control. The radio base station shown in FIG. 13 comprises a radio portion 63, communication channel circuits $112_1$ to $112_K$ provided to each channel, a common control circuit 111 for controlling these communication channel circuits $112_1$ to $112_K$ and a reference frame generating circuit 64.

The radio portion 63 demodulates the signal received by an antenna and outputs the demodulated base band signal as a signal R1. The radio portion 63 combines transmitting signals T1 from the communication channel circuits $112_1$ to $112_K$, and then modulates the combined signal thereafter to transmit it.

The reference frame generating circuit 64 generates and outputs a reference frame signal 26 which is the signal to be a reference of frame timing.

The common control circuit 111 controls the communication channel circuits $112_1$ to $112_K$ by using sector selection signals 20, control signals 23 and target SIR notification signals 24.

In case of starting the communication of one of the communication channel circuits $112_1$ to $112_K$, the common control circuit 111 specifies a sector (may be a plurality) to be used for that communication channel circuit by means of the sector selection signals 20, and further switches the control signal 23 corresponding to the communication channel circuit starting the communication from 0 to 1, that is, to be active.

As shown in FIG. 14, the communication channel circuit $112_1$ comprises an A/D converter 72, a D/A converter 73, an SIR estimating portion 141 and a TPC bit insertion circuit 74. The configuration of each of the communication channel circuits $112_2$ to $112_K$ is the same as that of the communication channel circuit $112_1$ shown in FIG. 14.

The A/D converter 72 converts the analog received signal R1 from the radio portion 63 into a digital signal. The SIR estimating portion 141 performs a path search based on the digital signal from the converter 72 and outputs a user received signal by despreading the digital signal. The SIR estimating portion 141 estimates the SIR of the user received signal, and then generates TPC information 25 based on the estimated SIR.

The TPC bit insertion circuit 74 inserts the TPC information 25 as TPC bits in an inputted user transmitting signal, and sends it to the D/A converter 73. The D/A converter 73 converts the user transmitting signal including the TPC bits into an analog signal so as to output it as the transmitting signal T1.

FIG. 15 shows a configuration of the SIR estimating portion 141 shown in FIG. 14. As shown in FIG. 15, the SIR estimating portion 141 comprises a path search circuit 2, a selector circuit 3, a despreading circuit 4, an ISSI estimation circuit 145, an RSSI estimation circuit 6, an SIR estimation circuit 7, an SIR addition circuit 8 and an SIR determination circuit 9.

The SIR estimating portion 141 has the control signal 23 supplied thereto from the common control circuit 111 shown in FIG. 13, and the SIR estimating portion 141 performs the following operation in the case where the control signal 23 is "1," and performs no operation in the case where the control signal 23 is "0."

The received signals R1 from M antennas are inputted to the path search circuit 2 and selector circuit 3 via the A/D converter 72. The signal R1 (y, t) [y=1, 2, . . . , M] means the signal from an antenna y of the M antennas when the time is t, and one antenna is provided to each sector. The M sector selection signals 20 inputted to the path search circuit 2 indicate which sector the path search is to be performed in, and are represented as SCT (1), SCT (2), . . . , SCT (M). In the case where the sector in which the path search is performed is a sector m, SCT (m) of the sector selection signals 20 is "1" and the sector selection signal corresponding to the sector in which the path search is not performed is "0." The path search can be performed in a plurality of sectors.

The path search circuit 2 takes in the signal R1 corresponding to the sector selected by the sector selection signals 20 (signal R1 (3, t) in the case where the selected sector is the sector 3, for instance), and detects correlation values between this signal and a predetermined code in reference to the reference frame signal 26 showing frame timing so that it selects N paths in the decreasing order of the correlation value. Results of the selection are outputted in parallel or serially as path information (1) to (N) shown in FIG. 16. The path information (1) to (N) includes source information and delay information. The source information indicates which sector the received signal is inputted from, and the delay information indicates how much the received signal is shifted in time from the timing shown by the frame signal. As each antenna normally has multi-path fading performed thereto, it may happen that a plurality of paths are selected from the same source. A concrete example of the path information outputted from the path search circuit 2 is shown in FIG. 17.

As shown in FIG. 18, the selector circuit 3 comprises M:1 selectors $41_1$ to $41_N$, and the signals R1 (R1 (1, t) to R1 (M, t)) are inputted to each of the selectors $41_1$ to $41_N$. Each of the selectors $41_1$ to $41_N$ selects the signal (sector) specified by the source information of the inputted path information, and outputs it as the signal R2 (R2 (1, t) to R2 (N, t)) to the despreading circuit 4.

As shown in FIG. 19, the despreading circuit 4 comprises multipliers $42_1$ to $42_N$, a code generator 44 and a delay circuit 43. The code generator 44 generates a predetermined code of code length L in synchronization with the reference frame signal 26, and the delay circuit 43 delays the inputted code by the value of the delay information of each of the path information (1) to (N). Each of the multipliers despreads the inputted signal R2 by multiplying the inputted signal R2 by the code from the delay circuit 43. The signals R3 (R3(1,t) to R3(N,t)) outputted from the multipliers are inputted to the ISSI estimation circuit 145 and the RSSI estimation circuit 6. In addition, each of the signals R3 is outputted as the user signal.

The ISSI estimation circuit 145 starts the ISSI estimation using a preset value as an initial value for turning the control signal 23 from "0" to "1." When performing the ISSI estimation of each of the signals R3, the ISSI estimation circuit 145 refers to the source information included in the path information (1) ~(N) to identify which sector each of the signals R3 is from, and then performs the ISSI estimation with the preset value as the initial value. The ISSI estimation circuit 145 periodically estimates the ISSI of each of the signals R3, and adds it and an immediately preceding ISSI value as a weight and outputs the result thereof as an ISSI signal to the SIR estimation circuit 7. The RSSI estimation circuit 6 periodically estimates the RSSI of each of the signals R3, and outputs the result thereof as an RSSI signal to the SIR estimation circuit 7.

The SIR estimation circuit 7 acquires sir of each of the N paths (each signal R3) by dividing each of the RSSI signals from the RSSI estimation circuit 6 by a corresponding ISSI signal of the ISSI signals from the ISSI estimation circuit 145 ("RSSI (1)/ISSI(1)"for instance). The SIR addition circuit 8 acquires the SIR by adding up the sir of each of the N paths.

The SIR determination circuit 9 compares the SIR from the SIR addition circuit 8 to the target SIR provided from the common control circuit 111, and outputs the TPC information 25 to the TPC bit insertion circuit 74. The TPC information 25 is "0" if the measured SIR is the target SIR or more, or it is "1" if smaller. Here, "1" is the signal for requesting the other station to increase the transmission power, and "0" for requesting it to be lowered.

Next, the operation of the SIR estimating portion 141 in this conventional radio base station will be described.

First, the path search circuit 2 detects the N paths by detecting the correlation values between the signal R1 corresponding to the sector specified by the sector selection signals 20 from the common control circuit 111 and the predetermined codes, and then outputs the detected results as the path information (1) to (N).

For instance, in the case where the sectors specified by the signals 20 are sectors 4 and 5 (M=5), the sector selection signals 20 are represented by the following expression (1).

$$SCT(m) = \begin{cases} 0 (m = 1, 2, 3) \\ 1 (m = 4, 5) \end{cases} \quad (1)$$

Each selector of the selector circuit 3 selects a necessary signal among the signals R1 according to the source information included in the path information (x), and outputs it as the signal R2 (x, t)[x=1, 2, . . . , N].

In the case where the path information (1) to (N) are the values shown in FIG. 17, two paths are detected from each of the sectors 4 and 5. In this case, the selector 41₁ selects and outputs the signal R1 (4, t) as the signal R2 (1, t), the selector 41₂ selects and outputs the signal R1 (4, t) as the signal R2 (2, t), the selector 41₃ selects and outputs the signal R1 (5, t) as the signal R2 (3, t), and the selector 414 selects and outputs the signal R1 (5, t) as the signal R2 (4, t). Each of the selectors 41₅ to 41ₙ selects none of the signals R1 (1,t) to R1(M,T). That is, the relationship between R1 (y, t) and R2(x, t) is represented by the following expression (2).

$$R2(1,t)=R1(4,t)\ R2(2,t)=R1(4,t)\ R2(3,t)=R1(5,t)\ R2(4,t)=R1(5,t)\ R2(x,t)=0\ x=5,6\ldots,N \quad (2)$$

The despreading circuit 4 despreads the signal R2 (x, t) with a despreading code independently for each path, and outputs a signal R3 (x, t) of a symbol rate (Fs). The code generated by the code generator 44 is used as the despreading code by adjusting the timing according to a delay value of the path information (x). If the code of code length L is C (k) and a timing function of each path based on the delay value is t (x), R3 is represented by the following expression (3). In the expression (3), t indicates t symbols.

$$R3(x, t) = \sum_{k=1}^{k=L} \{R2(x, k) \times C(k - t(x))\} \quad (3)$$

For instance, in the case of the path information (1) in FIG. 17, the delay value included in the path information (1) is '2'. Therefore, the value of the function t(1) is '2', and R3 (1, t) is represented by the following expression (4).

$$R3(1, t) = \sum_{k=1}^{k+L} \{R2(1, K) \times C(k - 2)\} = \sum \{R1(4, k) \times C(k - 2)\} \quad (4)$$

The signal R3 (x, t) is outputted as the user received signal to a demodulation circuit (not shown) and also outputted to the ISSI estimation circuit 145 and the RSSI estimation circuit 6.

In the ISSI estimation circuit 145 of the conventional radio base station, the ISSI estimation is started with the preset value as the initial value. This initial value is zero or a value obtained by the station.

As the ISSI is dominated by noise components, it fluctuates little by little but does not fluctuate greatly in a long period of time. For this reason, the ISSI estimation is generally performed so that the change in the estimate is gentle and it becomes stable. Therefore, the estimate does not change from the initial value for a while from a start of the ISSI estimation. Thus, in the case where the initial value is zero, the estimate is a value close to zero for a while from the start of the estimation, and consequently the SIR value erroneously becomes a significantly large value. In that case, it is determined to be larger than the target SIR independently of actual link quality, and so the other station is requested to decrease the transmission power. And if the other station decrease the transmission power accordingly, the link quality is further deteriorated so as to cause a link break in the worst case.

In the case where the initial value is not adequately set, the ISSI estimation usually takes a long time, and so the SIR value during that time becomes incorrect. For instance, in the case where the SIR erroneously becomes high, there is a danger of the link break because of requesting the other station to decrease the transmission power, and in the case where the SIR becomes low inversely, there is a danger of increasing the interference to other users because of requesting it to increase the transmission power.

In the case where a value obtained in advance by the station is used as the initial value, it is necessary to change the value for each station so that management of the parameters becomes a huge amount of work. Moreover, it may not always be an optimum value since it is not a real-time value.

As described above, there is a problem that the transmission power control becomes unstable immediately after starting user communication in the case where the conventional radio base station estimates the ISSI used at the time of measuring the SIR of the received signal which is the reference of the transmission power control.

SUMMARY OF THE INVENTION

An object of the present invention is, by implementing highly accurate SIR estimation, to provide a radio base station capable of performing stable transmission power control immediately after starting the user communication.

According to the first aspect of the present invention, a radio receiving apparatus comprising:

SIR estimating means for, from a desired signal level and an interference signal level of a received signal from a radio transmitting apparatus, estimating an SIR (Signal to Interference power Ratio) value of the received signal; and storing means for storing a current interference signal level of each sector, wherein on starting communication, the above SIR estimating means measures the interference signal level of the sector where the communication is started by using as an initial value the interference signal level corresponding to the sector where the communication is started of the interference signal levels stored in the above storing means, and stores in the above storing means the measured interference signal level on finishing the communication in the case where the communication is finished.

According to the second aspect of the present invention, a radio receiving apparatus comprising:

SIR estimating means for, from a desired signal level and an interference signal level of a received signal from a radio transmitting apparatus, estimating an SIR (Signal to Interference power Ratio) value of the received signal;

storing means for storing a current interference signal level of each sector; and one or a plurality of control channel circuits for periodically measuring the interference signal level of each sector and storing in the above storing means the measured interference signal level of each sector, wherein on starting communication, the above SIR estimating means measures the interference signal level of the sector where the communication is started by using as an initial value the interference signal level corresponding to the sector where the communication is started of the interference signal levels stored in the above storing means.

In the above radio receiving apparatus, the above SIR value measured by the above SIR estimating means is used for controlling a transmission power of a radio link from the above radio transmitting apparatus to the above radio receiving apparatus.

According to the third aspect of the present invention, an SIR estimation method of a radio receiving apparatus for, from a desired signal level and an interference signal level of a received signal, estimating an SIR (Signal to Interference power Ratio) value of the received signal, comprising the steps of:

on a start of the above radio receiving apparatus, measuring the interference signal level of each sector and storing it in storing means of the above radio receiving apparatus;

on starting communication, measuring the interference signal level of the sector where the communication is started by using as an initial value the interference signal level corresponding to the sector where the communication is started of the interference signal levels stored in the above storing means, for the sake of estimating the above SIR; and storing in the above storing means the measured interference signal level on finishing the communication in the case where the communication is finished.

According to the fourth aspect of the present invention, an SIR estimation method of a radio receiving apparatus for, from a desired signal level and an interference signal level of a received signal, estimating an SIR (Signal to Interference power Ratio) value of the received signal, comprising the steps of:

periodically measuring the interference signal level of each sector and storing it in storing means of the above radio receiving apparatus: and on starting communication, measuring the interference signal level of the sector where the communication is started by using as an initial value the interference signal level corresponding to the sector where the communication is started of the interference signal levels stored in the above storing means, for the sake of estimating the above SIR.

According to the fifth aspect of the present invention, a transmission power controlling method comprising the steps of:

comparing an SIR value measured by the above SIR estimation method to a predetermined target SIR value; and in the case where the measured SIR value is smaller than the target SIR value, instructing a radio transmitting apparatus having sent the above received signal to increase a transmission power, and in the case where the measured SIR value is the target SIR value or more, instructing the above radio transmitting apparatus to decrease the transmission power.

According to the sixth aspect of the present invention, a program for having a computer perform an SIR estimation method of a radio receiving apparatus for, from a desired signal level and an interference signal level of a received signal, estimating an SIR (Signal to Interference power Ratio) value of the received signal, having the computer perform the processes of:

on a start of the above radio receiving apparatus, measuring the interference signal level of each sector and storing it in storing means of the above radio receiving apparatus;

on starting communication, measuring the interference signal level of the sector where the communication is started by using as an initial value the interference signal level corresponding to the sector where the communication is started of the interference signal levels stored in the above storing means, for the sake of estimating the above SIR; and storing in the above storing means the measured interference signal level on finishing the communication in the case where the communication is finished.

According to the seventh aspect of the present invention, a program for having a computer perform an SIR estimation method of a radio receiving apparatus for, from a desired signal level and an interference signal level of a received signal, estimating an SIR (Signal to Interference power Ratio) value of the received signal, having the computer perform the processes of:

periodically measuring the interference signal level of each sector and storing it in storing means of the above radio receiving apparatus: and on starting communication, measuring the interference signal level of the sector where the communication is started by using as an initial value the interference signal level corresponding to the sector where the communication is started of the interference signal levels stored in the above storing means, for the sake of estimating the above SIR.

According to the present invention, it is possible to start ISSI estimation with an appropriate interference signal level as an initial value by using as an ISSI initial value on starting communication a current interference signal level measured in an radio receiving apparatus and stored in storing means and on finishing the communication, storing the measured interference signal level at that time in the storing means so as to perform highly accurate SIR estimation even immediately after starting user communication.

According to the present invention, in the case where a control channel which is a channel for making random access to control information between the stations is used in addition to a communication channel which is a channel for actually handling a user signal, it is possible to constantly measure an interference signal level in a control channel circuit and use this interference signal level as the initial value. That is, it is possible to use the current interference signal level as the initial value. For this reason, highly accurate SIR estimation can be performed without being influenced by occurrence frequency of the user communication.

According to the present invention, it is possible to perform stable transmission power control even immediately after starting the user communication because the transmission power control is performed based on an SIR value measured by the SIR estimation method.

DETAILED DESCRIPTION OF THE PREFERRED EMBODIMENTS

Figure 1:
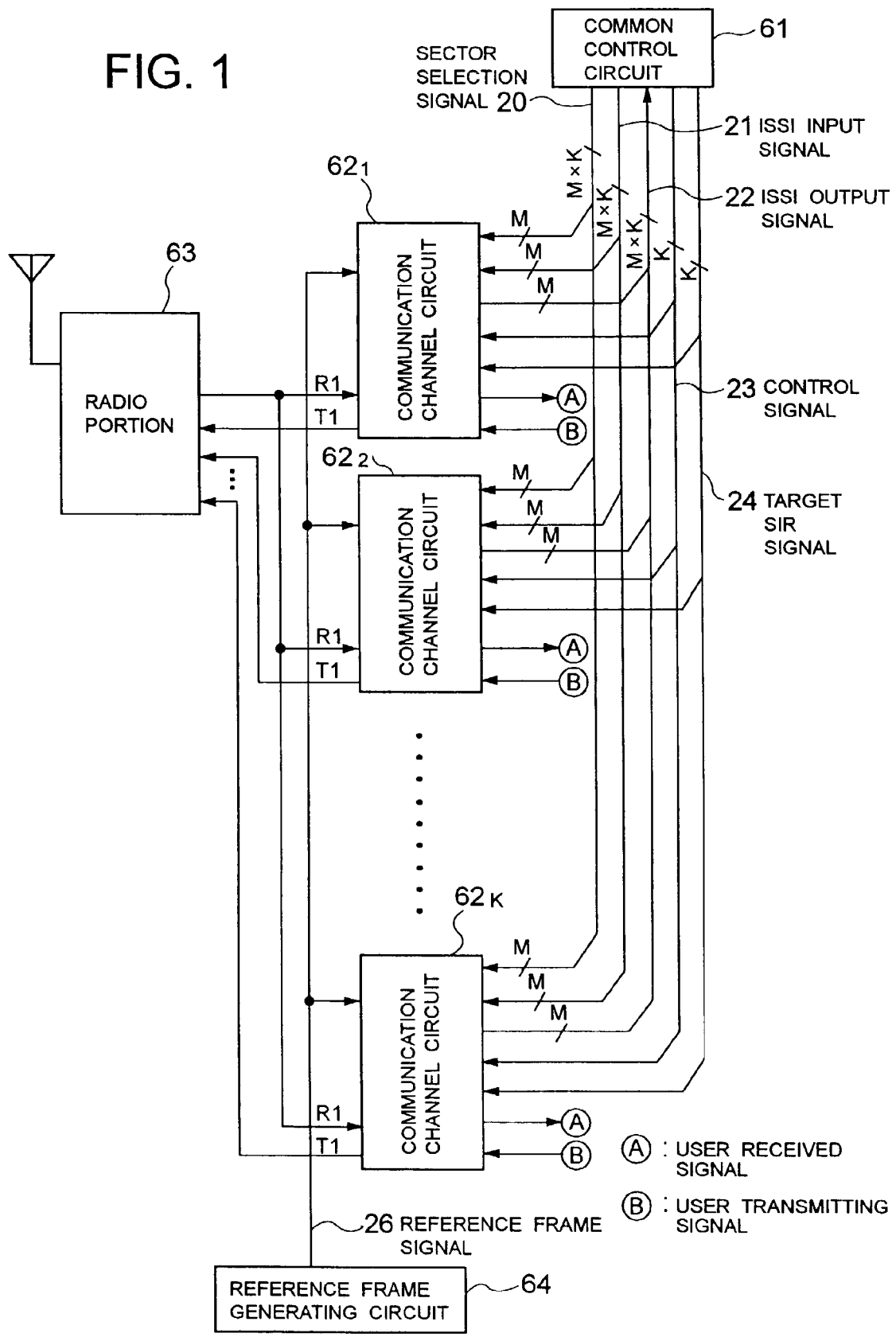
FIG. 1 is a block diagram showing a configuration of a radio base station according to a first embodiment of the present invention.

Next, embodiments of the present invention will be described in detail by referring to the drawings.

Figure 13:
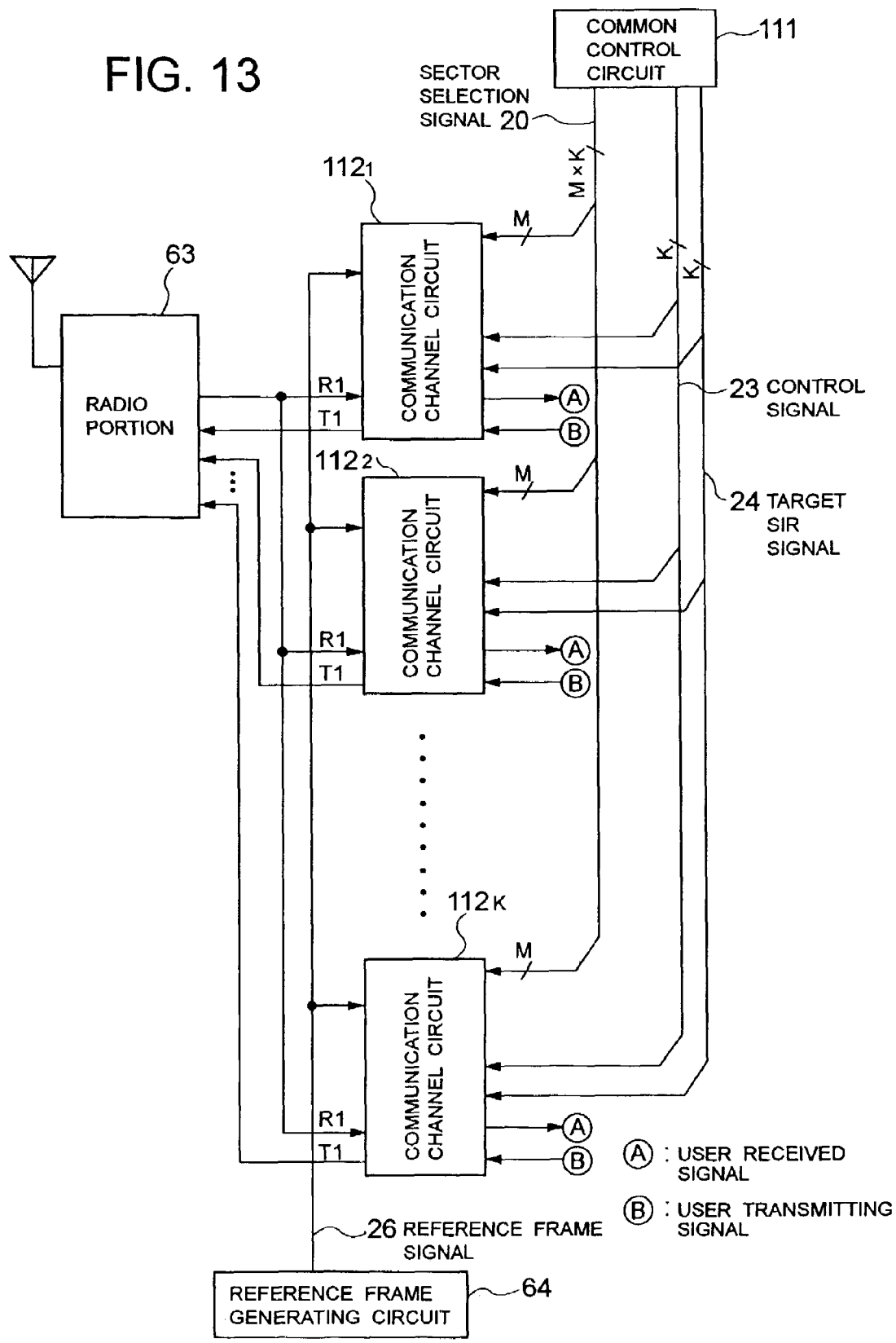
FIG. 13 is a block diagram showing a configuration of a conventional radio base station.

FIG. 1 is a block diagram showing a configuration of a radio base station according to a first embodiment of the present invention. In FIG. 1, the same components as those shown in FIG. 13 are given the same reference numerals, and description thereof will be omitted.

The radio base station according to this embodiment comprises a common control circuit 61, communication channel circuits $62_1$ to $62_K$, a radio portion 63 and a reference frame generating circuit 64.

The common control circuit 61 has a current ISSI value of each sector stored therein. The current ISSI values are updated independently for each sector by ISSI values transmitted from one of the communication channel circuits as ISSI output signals 22. To be more specific, the common control circuit 61 functions as storing means for storing the ISSI value of each sector. In addition, the common control circuit 61 has a value preset as an initial value such as zero stored therein.

In the case where one of the communication channel circuits starts communication, the common control circuit 61 specifies a sector (may be a plurality) to be used for that communication channel circuit by means of sector selection signals 20, and outputs to the channel circuit a current ISSI value corresponding to the specified sector, and further switches a control signal 23 to the channel circuit from 0 to 1. If immediately after starting the station (that is, no current ISSI value is written yet), the common control circuit 61 specifies all the sectors for one of the communication channel circuits, and turns on that communication channel circuit with the control signal 23, and then turns it off after fixed time elapses. Thus, the current ISSI values of all the sectors are stored in the common control circuit 61 before a start of actual communication.

On starting communication, each of the communication channel circuits $62_1$ to $62_K$ read the current ISSI value corresponding to the sector where the communication is started (specified sector) of the current ISSI values stored in the common control circuit 61 as an ISSI input signal 21, and outputs the ISSI value on finishing the communication to the common control circuit 61 as the ISSI output signal 22 in the case where the communication is finished, which is different from communication channel circuits $112_1$ to $112_K$ of the conventional radio base station shown in FIG. 13.

Figure 2:
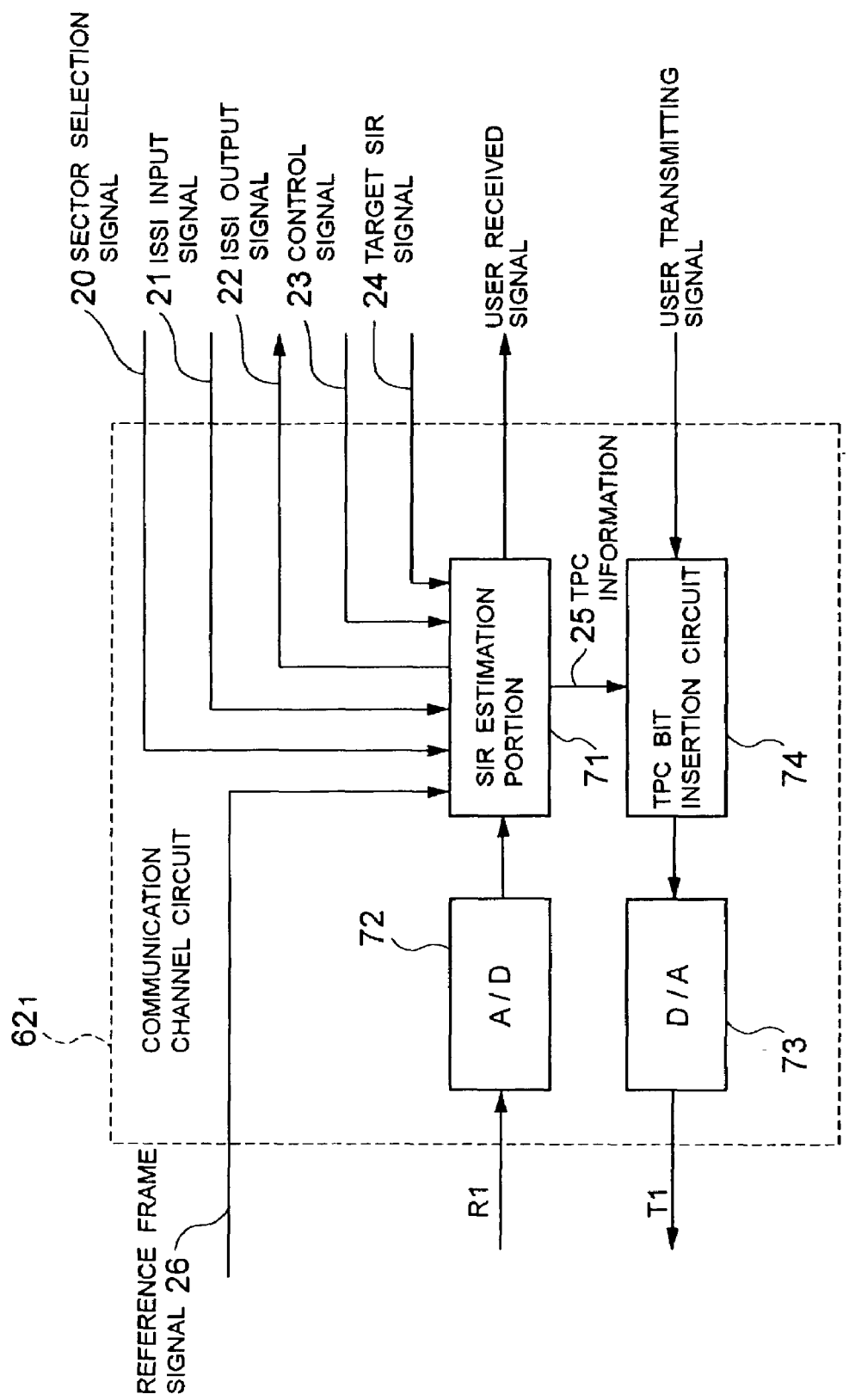
FIG. 2 is a block diagram showing a configuration of a communication channel circuit $62_1$ in FIG. 1.
Figure 14:
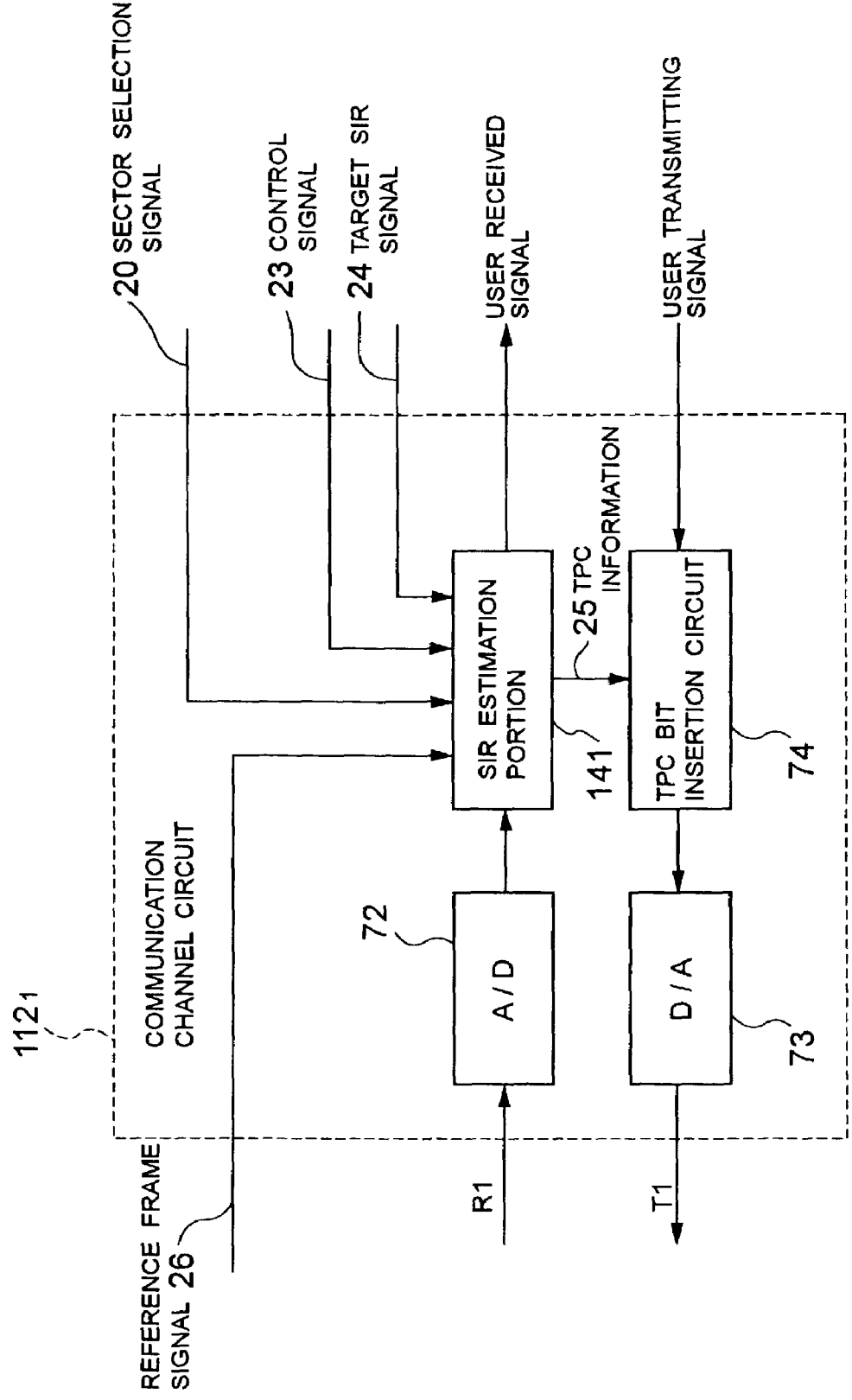
FIG. 14 is a block diagram showing a configuration of a communication channel circuit $112_1$ in FIG. 13.

As shown in FIG. 2, the communication channel circuit $62_1$ comprises an SIR estimation portion 71, an A/D converter 72, a D/A converter 73 and a TPC bit insertion circuit 74. In FIG. 2, the same components as those shown in FIG. 14 are given the same reference numerals, and description thereof will be omitted. The configuration of the communication channel circuit $62_2$ to $62_K$ is the same as that of the communication channel circuit $62_1$ shown in FIG. 2, and so the description thereof will be omitted.

Figure 3:
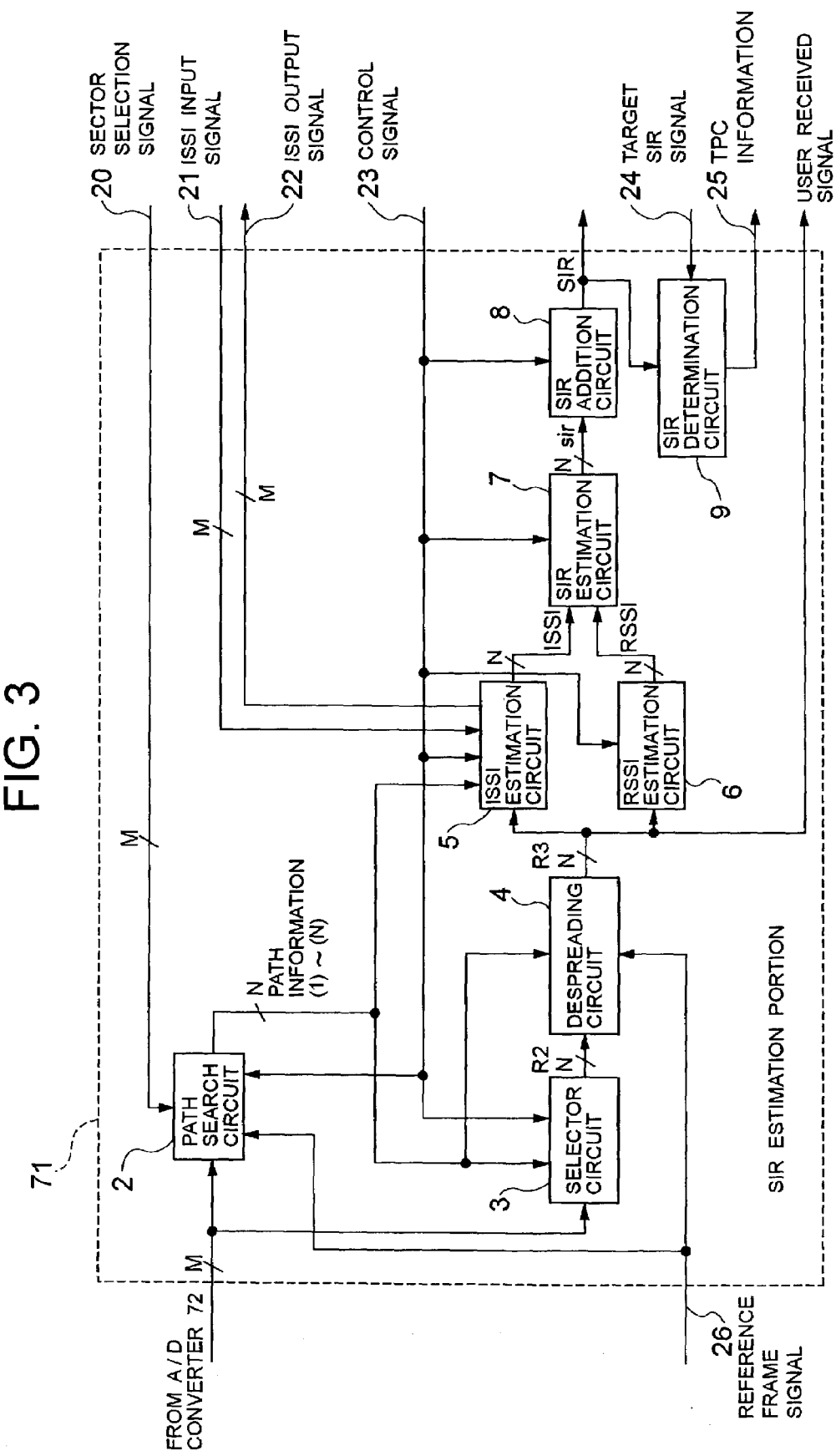
FIG. 3 is a block diagram showing a configuration of an SIR estimating portion 71 in FIG. 2.
Figure 15:
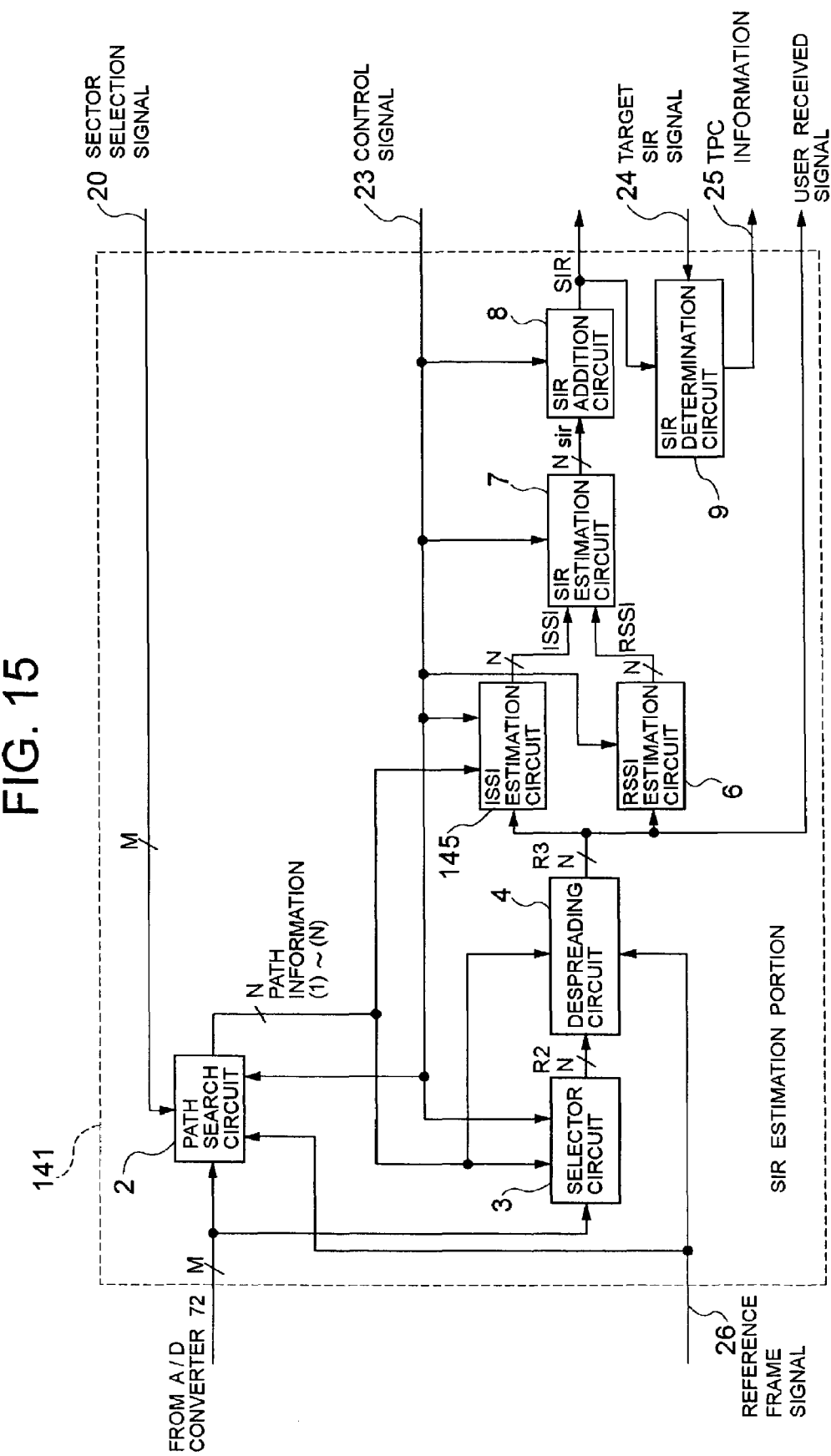
FIG. 15 is a block diagram showing a configuration of an SIR estimating portion 141 in FIG. 14.
Figure 16:
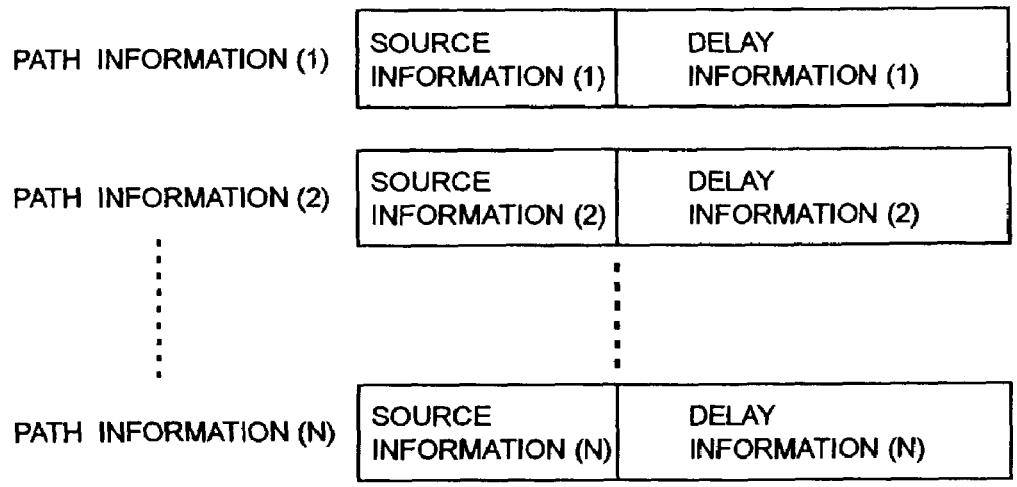
FIG. 16 is a diagram showing a configuration of path information outputted from a path search circuit 2.

FIG. 3 is a block diagram showing a configuration of the SIR estimating portion 71 in FIG. 2. The SIR estimating portion 71 is different from the SIR estimating portion 141 shown in FIG. 15 only in that an ISSI estimation circuit 145 is replaced by an ISSI estimation circuit 5.

If the control signal 23 turns from "0" to "1," the ISSI estimation circuit 5 starts the ISSI estimation with the value inputted by the ISSI input signal 21 as the initial value. The ISSI input signal 21 is the current ISSI value of the corresponding sector provided from the common control circuit 61 shown in FIG. 1. When performing the ISSI estimation of each signal R3, the ISSI estimation circuit 5 refers to source information included in path information, identifies which sector each signal R3 is from, and estimates the ISSI of each signal R3 with the current ISSI value of the corresponding sector as the initial value. For instance, in the case where source (1) (meaning the source information (1) of the path information (1)) is "3" and source (2) is "4," the signal R3 (1, t) is the signal from a sector 3 and the signal R3 (2, t) is the signal from a sector 4, so that the initial value used for the ISSI estimation of the signal R3 (1, t) is ISSI #IN (3) and that of the signal R3 (2, t) is ISSI #IN (4). The ISSI estimation circuit 5 periodically estimates the ISSI of each signal R3, and adds the estimated ISSI and an immediately preceding ISSI value as a weight and outputs the result thereof as the ISSI output signal 22 to the SIR estimation circuit 7 and the common control circuit 61. In addition, the ISSI estimation circuit 5 acquires an average of the estimated ISSIs of the signals R3 from the same sector and outputs the average as the ISSI output signal 22 to the common control circuit 61.

Next, operation of the radio base station according to the first embodiment of the present invention will be described.

First, the ISSI estimation circuit 5 identifies which sector each signal R3 is from by checking the source information (1) to (N) included in the path information (1) to (N). If the source information is '0', the ISSI estimation circuit 5 does not estimate the ISSI of the corresponding signal R3. When the control signal 23 turns from "0" to "1," the initial values used for estimating the ISSIs of the signals R3 are inputted to the circuit 5 as the ISSI input signals 21. The ISSI estimation circuit 5 periodically estimates the ISSI of each signal R3 by using the corresponding initial value. The estimated ISSI of each signal R3 is added to the immediately preceding ISSI value as the weight and the result thereof is outputted to the SIR estimation circuit 7 and the common control circuit 61. Therefore, ISSI (x, Tn) of the signal R3 (x,t) in a period Tn is represented by the following expression (5).

$$ISSI(x, Tn) = \begin{cases} \alpha \times issi(x, Tn) + (1-\alpha) \times ISSI(x, Tn-1) & Tn > 0 \\ \alpha \times issi(x, T0) + (1-\alpha) \times ISSI\_IN(\text{Source}(x)) & Tn = 0 \end{cases} \quad (5)$$

Here, source (x) indicates the sector from which the signal R3(x,t) is inputted, and the ISSI (x, Tn) is the ISSI estimate in the period Tn, and a is a weighting coefficient.

Figure 17:
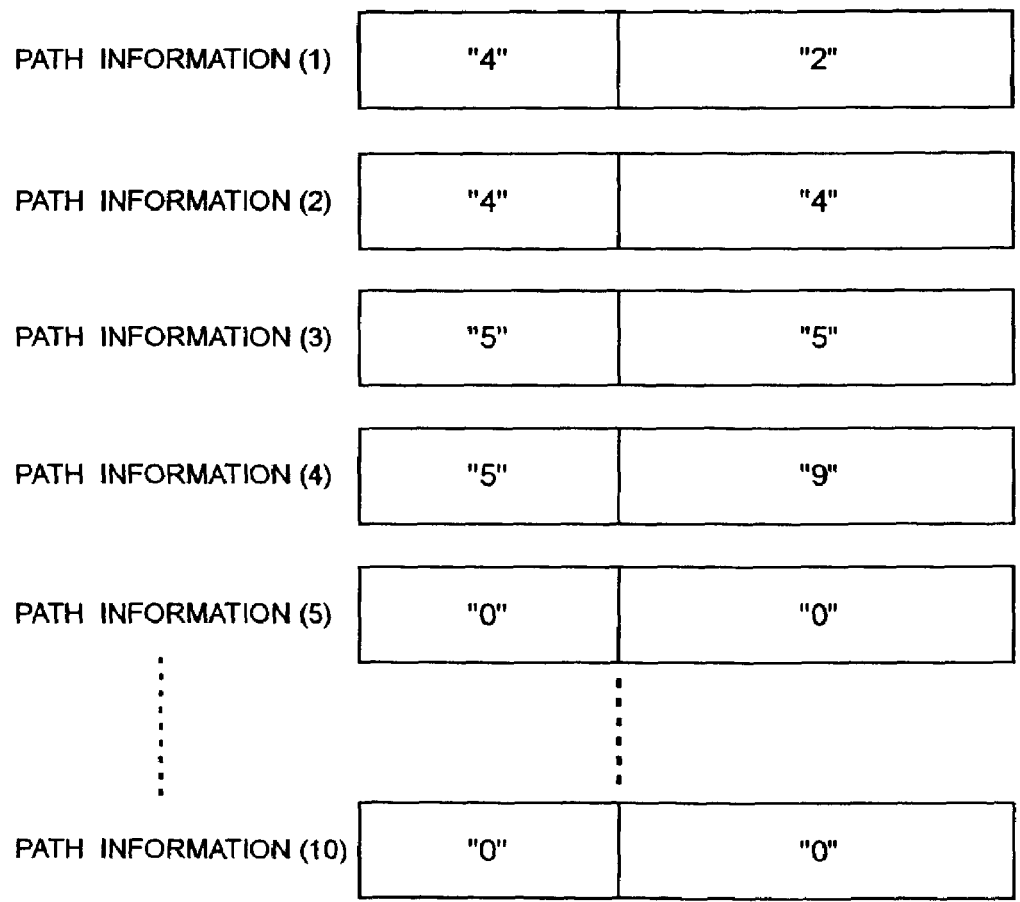
FIG. 17 is a diagram showing a concrete example of the path information outputted from the path search circuit 2.
Figure 18:
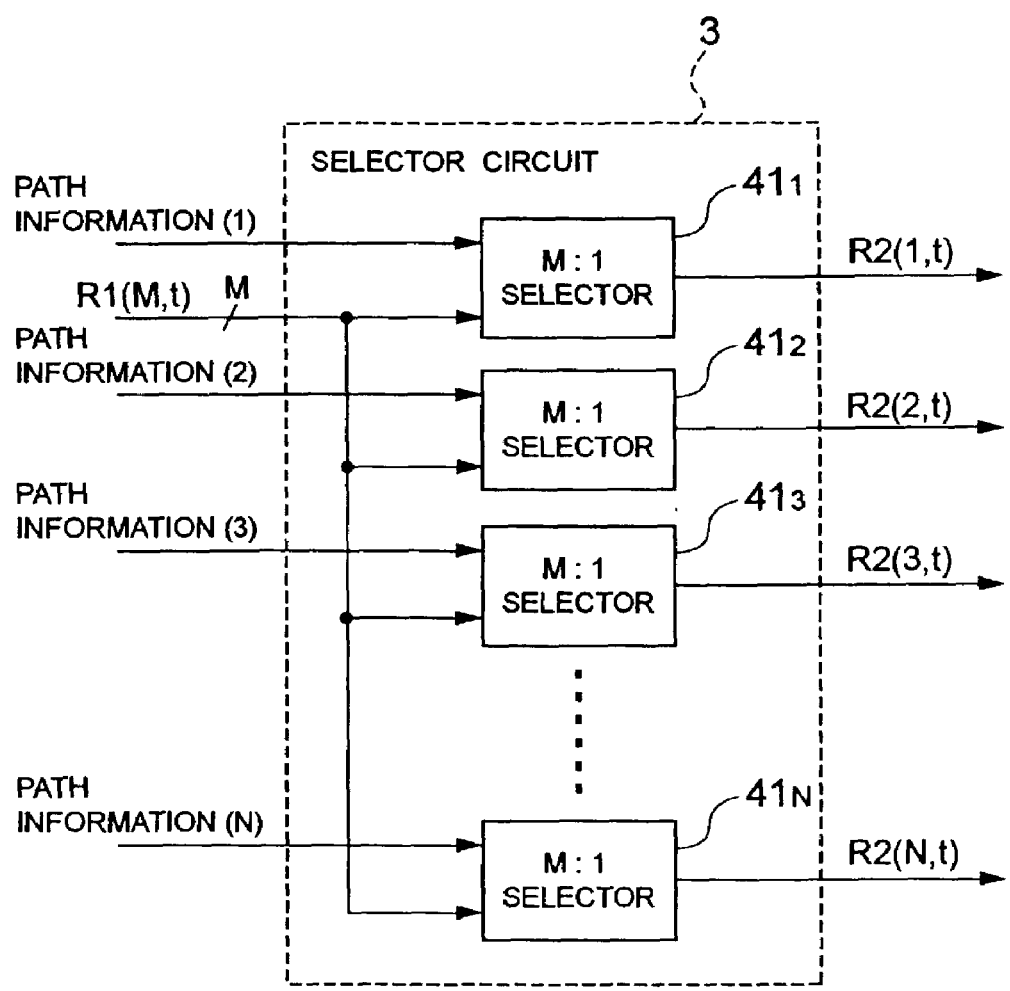
FIG. 18 is a block diagram showing a configuration of a selector circuit 3.
Figure 19:
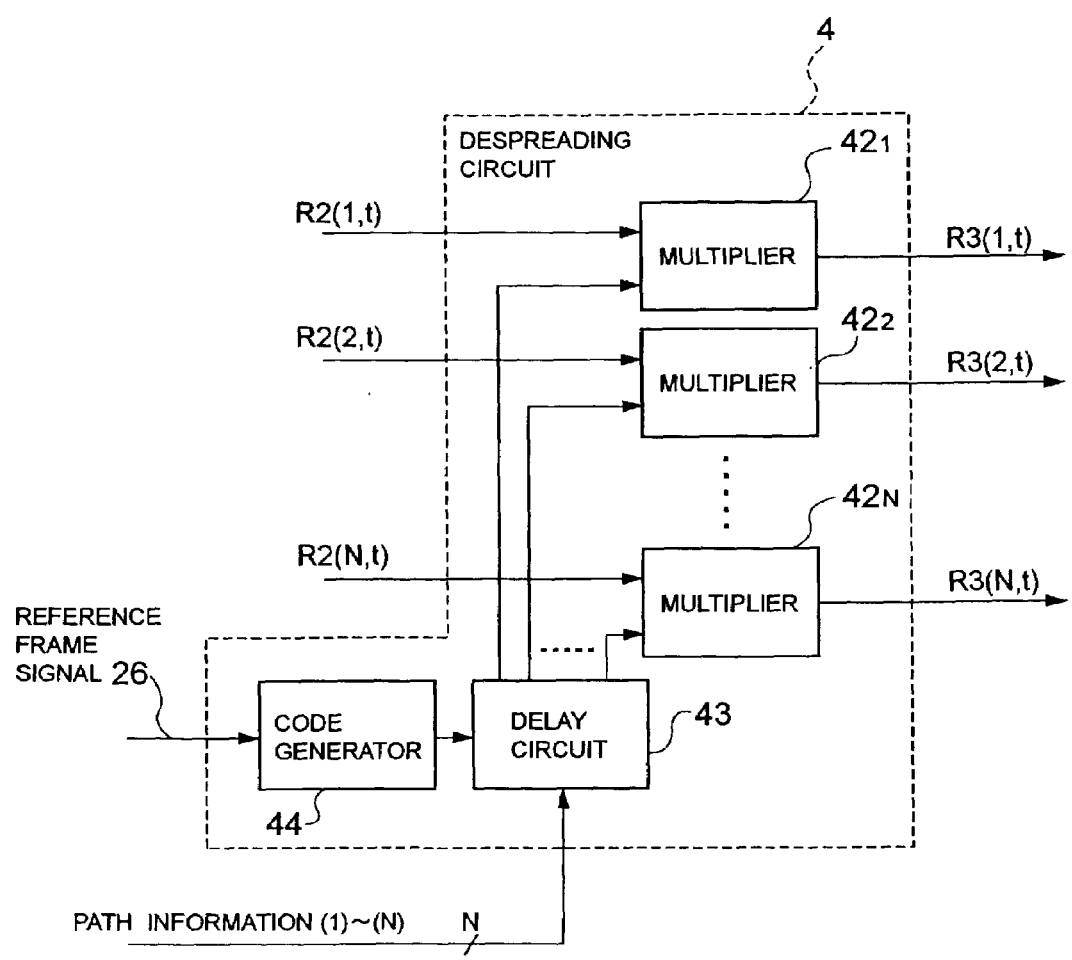
FIG. 19 is a block diagram showing a configuration of a despreading circuit 4.

The ISSI estimation circuit 5 outputs to the circuit 7 and 61 the ISSIs (1,Tn) to (N,Tn) which are results of the estimation. In addition the ISSI estimation circuit 5 calculates the average of the ISSIs of the signals R3 from the same sector. ISSI #OUT (m) which is the result thereof is outputted as the ISSI output signal 22 to the common control circuit 61. In the case where the values of the path information are as shown in FIG. 17, ISSI #OUT (4) and ISSI #OUT (5) are represented by the following expression (6).

$$ISSI\_OUT(4) = \text{Ave}(ISSI(1,Tn), ISSI(2,Tn)) \; ISSI\_OUT(5) = \text{Ave}(ISSI(3,Tn), ISSI(4,Tn)) \quad (6)$$

It is for the purpose of storing the current ISSI value of each sector that the ISSI output signal 22 is outputted to the common control circuit 61. The current ISSI value is stored independently for each sector, and only the current ISSI values of the sectors 4 and 5 are updated in the case where the values of the path information are as shown in FIG. 17. As described above, this current ISSI value is used as the ISSI initial value in the case where one of the communication channel circuits performs the communication next time.

An RSSI estimation circuit 6 periodically estimates an RSSI of each signal R3, and this period is the same as the period of the ISSI estimation and is also in synchronization therewith. RSSI (x, Tn) of the signal R3(x,t) estimated in the period Tn is represented by the following expression (7).

$$RSSI(x, Tn) = \begin{cases} \beta \times rssi(x, Tn) + (1-\beta) \times RSSI(x, Tn-1) & Tn > 0 \\ \beta \times rssi(x, T0) & Tn = 0 \end{cases} \quad (7)$$

Here, the RSSI (x, Tn) is an RSSI estimate in the period Tn, and β is a weighting coefficient.

The value of α is generally a small value such as 0.01 so that the ISSI does not change abruptly and becomes stable, whereas the value of β is generally a large value such as 0.99 inversely to allow a faster tracking speed because the RSSI changes greatly. Thus, while the ISSI estimation is significantly influenced by an immediately preceding ISSI value, and in particular the initial value, the RSSI estimation is influenced only a little by a previous value.

The ISSI of each signal R3 (each path) estimated by the circuit 5 and the RSSI of each path estimated by the circuit 6 are inputted to the SIR estimation circuit 7 and are divided as shown by the following expression (8). The sir of each path acquired by the circuit 7 is outputted to the SIR addition circuit 8.

$$sir(x,Tn) = RSSI(x,Tn)/ISSI(x,Tn) \quad (8)$$

The SIR addition circuit 8 adds up the sirs of all the N paths from the circuit 7 as shown by the following expression (9).

$$SIR \sum_{x=1}^{x=N} sir(x) \quad (9)$$

Figure 12:
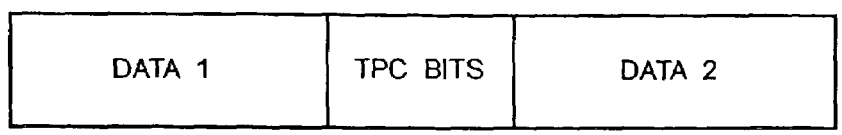
FIG. 12 is a diagram showing a format of data transmitted and received between the radio base station 90 and mobile station 94 shown in FIG. 11.

The SIR is compared to the predetermined target value (target SIR) in the SIR determination circuit 9, and TPC information 25 indicating the compared result is outputted. In the case where the SIR after the addition is smaller than the target SIR value, the value of the TPC information 25 becomes "1" in order to have a mobile station as the other station increase the transmission power, and in the case where it is the target SIR value or more, it inversely becomes "0." The TPC information 25 is inputted to the TPC bit insertion circuit 74 in FIG. 2, and the TPC bit insertion circuit 74 inserts TPC bits to the transmitting data based on the TPC information 25 as shown in FIG. 12.

Figure 4:
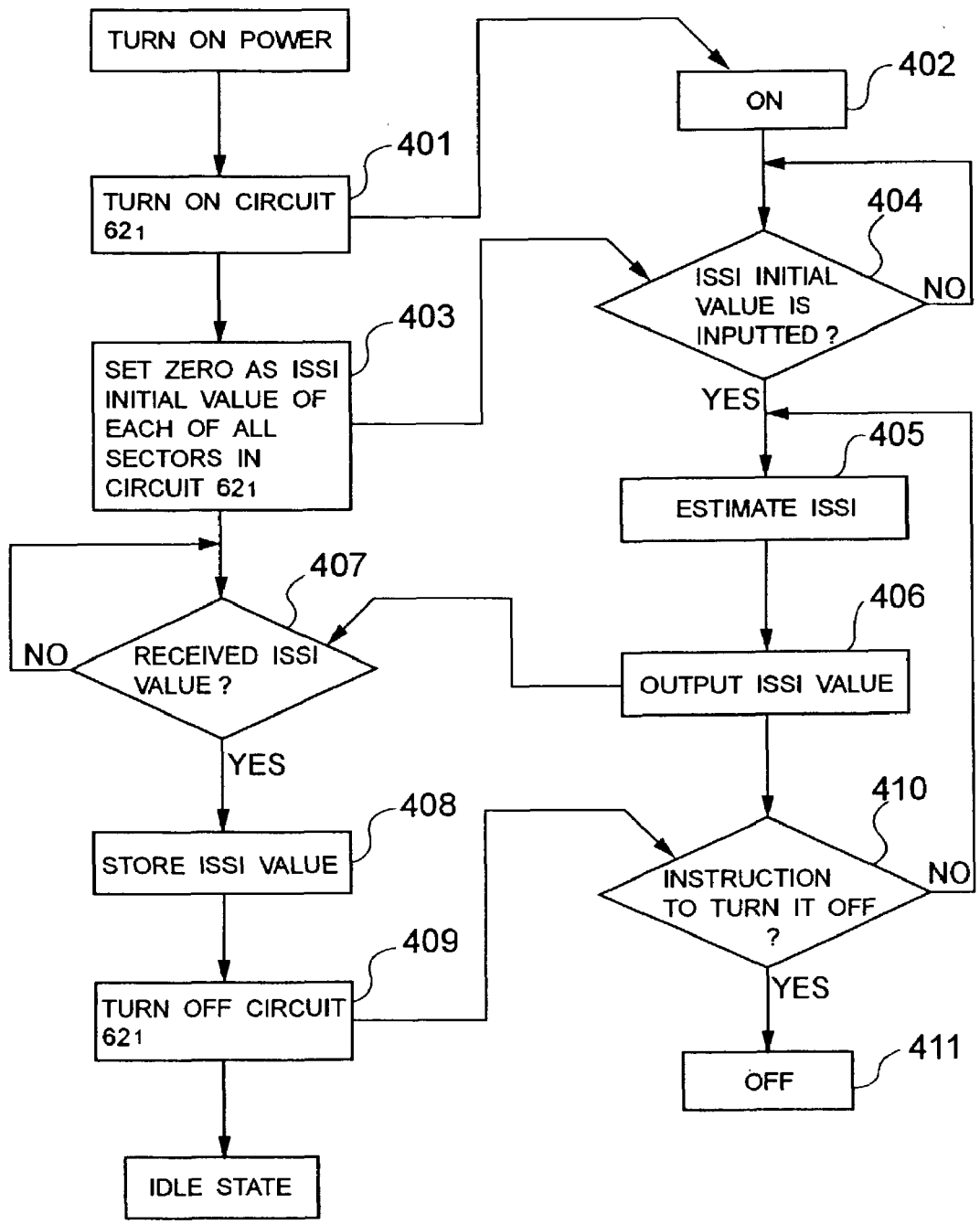
FIG. 4 is a flowchart for explaining a process of measuring an ISSI used as an initial value by a transmission power control method of the radio base station according to the first embodiment of the present invention.
Figure 5:
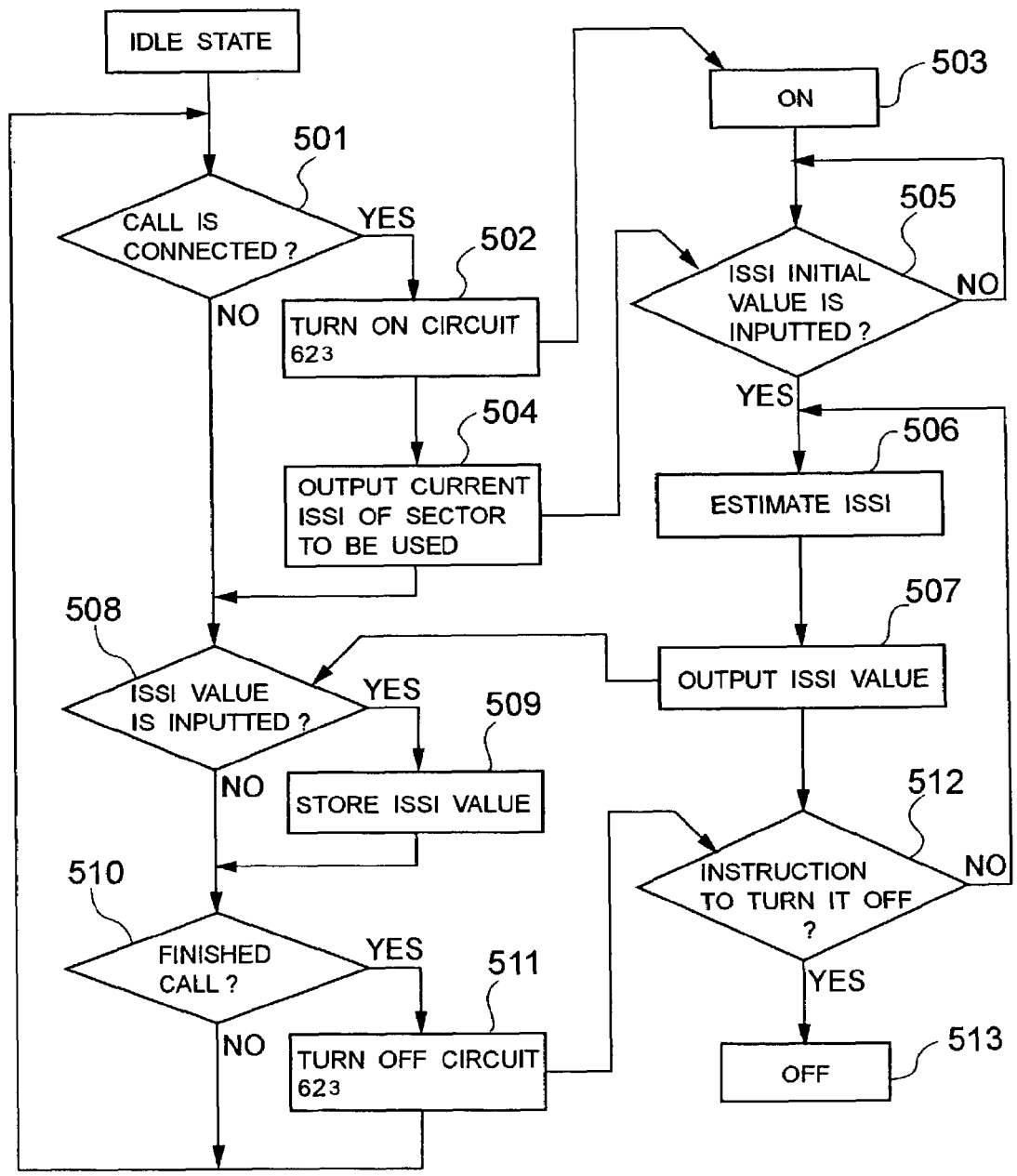
FIG. 5 is a flowchart for explaining a process after measuring the ISSI used as the initial value according to the process shown in FIG. 4

FIG. 4 is a flowchart for explaining a process of measuring an ISSI used as an initial value by a transmission power control method of the radio base station according to the first embodiment of the present invention, and FIG. 5 is a flowchart for explaining a process after measuring the ISSI used as the initial value once. The processes in the case where the communication channel circuit 62₁ measures the ISSI of each sector immediately after the power of the common control circuit 61 is turned on, and user communication is performed thereafter by using the communication channel circuit 62₃ will be described.

First, if the power of the common control circuit 61 is turned on, the communication channel circuit 62₁ is turned on by the control signal 23 (step 401). Then, the communication channel circuit 62₁ is put in an on state (step 402). Next, the common control circuit 61 sets zero as the ISSI initial value of each of all the sectors in the communication channel circuit 62₁ by using the ISSI input signal 21 (step 403). If the ISSI initial value of each sector is inputted from the common control circuit 61 (step 404), the communication channel circuit 62₁ performs the ISSI estimation with that value as the initial value (step 405), and outputs the estimated ISSI value as the ISSI output signal 22 to the common control circuit 61 (step 406).

On receiving the ISSI value from the communication channel circuit ₁ (step 407), the common control circuit 61 stores the value for each sector (step 408). And on finishing the communication, the common control circuit 61 provides an instruction to turn off the communication channel circuit 621 by using the control signal 23 (step 409). On receiving the instruction from the common control circuit 61 (step 410), the communication channel circuit 62₁ is put in an off state (step 411).

According to the process shown in FIG. 4, the ISSI value of each sector estimated by the communication channel circuit 62₁ is stored in the common control circuit 61 instead of the preset initial value of zero. The process in the case where a call is generated in the communication channel circuit 62₃ in such a state will be described by referring to the flowchart in FIG. 5.

If the call is connected (step 501), the common control circuit 61 provides an instruction to turn on the communication channel circuit 62₃ by using the control signal 23 (step 502). On receiving the instruction from the common control circuit 61, the communication channel circuit 62₃ is put in the on state. Next, the common control circuit 61 outputs to the communication channel circuit 62₃ the ISSI value of the sector to be used, of the stored ISSI values (current ISSI values of all the sectors), by using the ISSI input signal 21 (step 504). When the current ISSI value from the common control circuit 61 is inputted (step 505), the communication channel circuit 62$_3$ performs the ISSI estimation with that value as the initial value (step 506), and outputs the estimated ISSI value to the common control circuit 61 by using the ISSI output signal 22 (step 507).

On receiving the ISSI value from the communication channel circuit 62$_3$ (step 508), the common control circuit 61 stores the value associating it with the corresponding sector (step 509). And on finishing the call (step 510), the common control circuit 61 provides an instruction to turn off the communication channel circuit 62$_3$ by using the control signal 23 (step 511). On receiving the instruction from the common control circuit 61 (step 512), the communication channel circuit 62$_3$ is put in an off state (step 513).

In the radio base station according to the first embodiment, the current ISSI value of each sector is constantly stored in the common control circuit 61, and the ISSI value of the sector used for the user communication is periodically updated while the user communication is performed. Thus, it is possible, in case of starting the user communication in one of the communication channel circuits, to perform the ISSI estimation with the current ISSI value at that point in time, which can prevent an SIR estimate from erroneously becoming smaller or larger so as to perform stable transmission power control immediately after starting the user communication.

Next, the radio base station according to a second embodiment of the present invention will be described.

The radio base station according to the first embodiment has the current ISSI value of each sector constantly stored in the common control circuit 61 to perform the ISSI estimation with the current ISSI value of the sector used for the user communication as the initial value so as to allow stable transmission power control to be performed immediately after starting the user communication. In the case where generation frequency of user data is low, however, reliability of each ISSI value stored in the common control circuit 61 becomes low if there arises a time interval between generation of certain user data and generation of the next user data. In addition, it is necessary to turn on one of the communication channel circuits in order to measure the ISSI of each sector immediately after the start of the station, so that sequences at the start increase and become complicated.

The radio base station according to the second embodiment is intended to solve such problems. The ISSI estimation is periodically performed by a control channel circuit constantly monitoring all the sectors from immediately after the start of the station, and then each ISSI value in a common control circuit 121 is updated.

Figure 6:
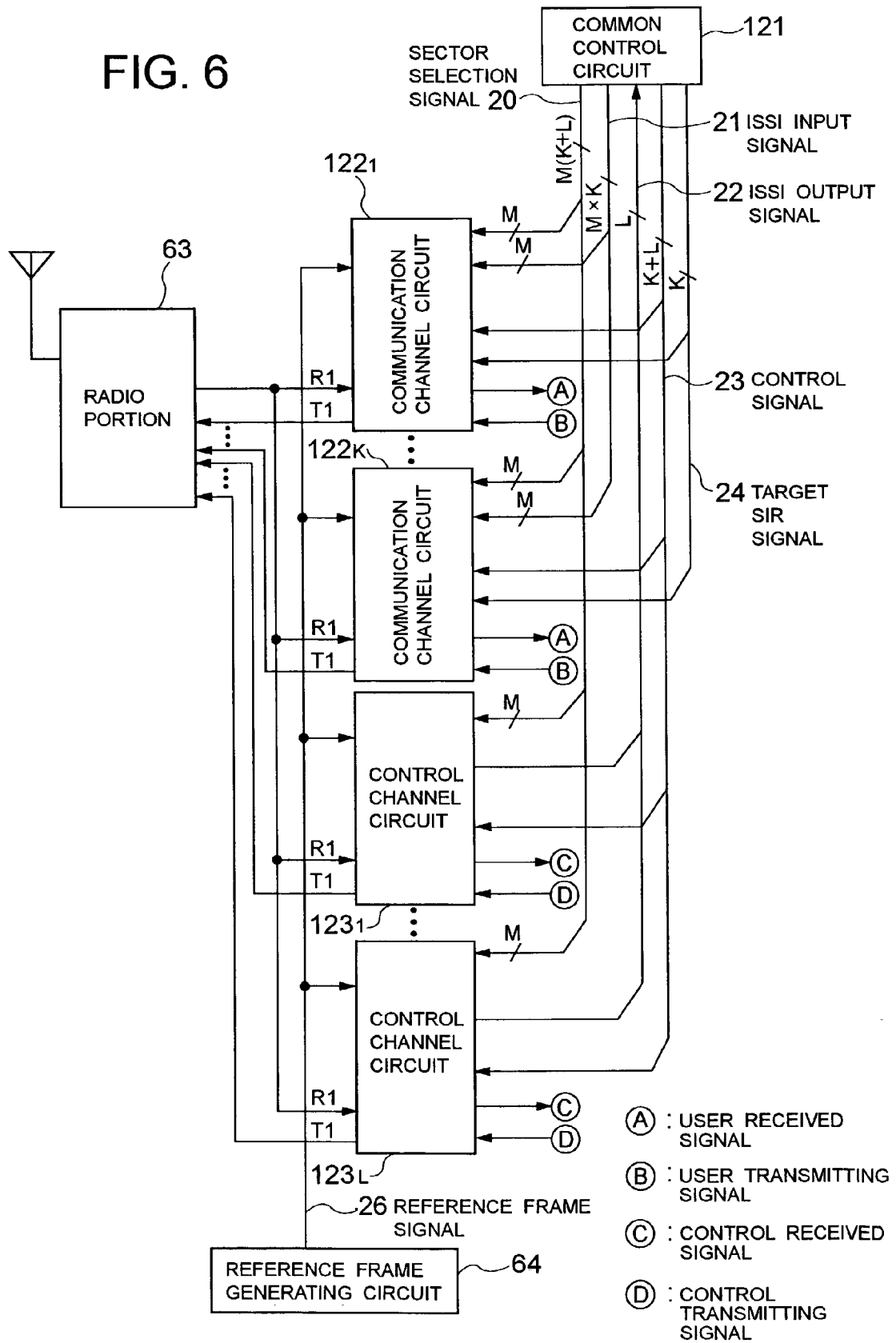
FIG. 6 is a block diagram showing a configuration of a radio base station according to a second embodiment of the present invention.
Figure 7:
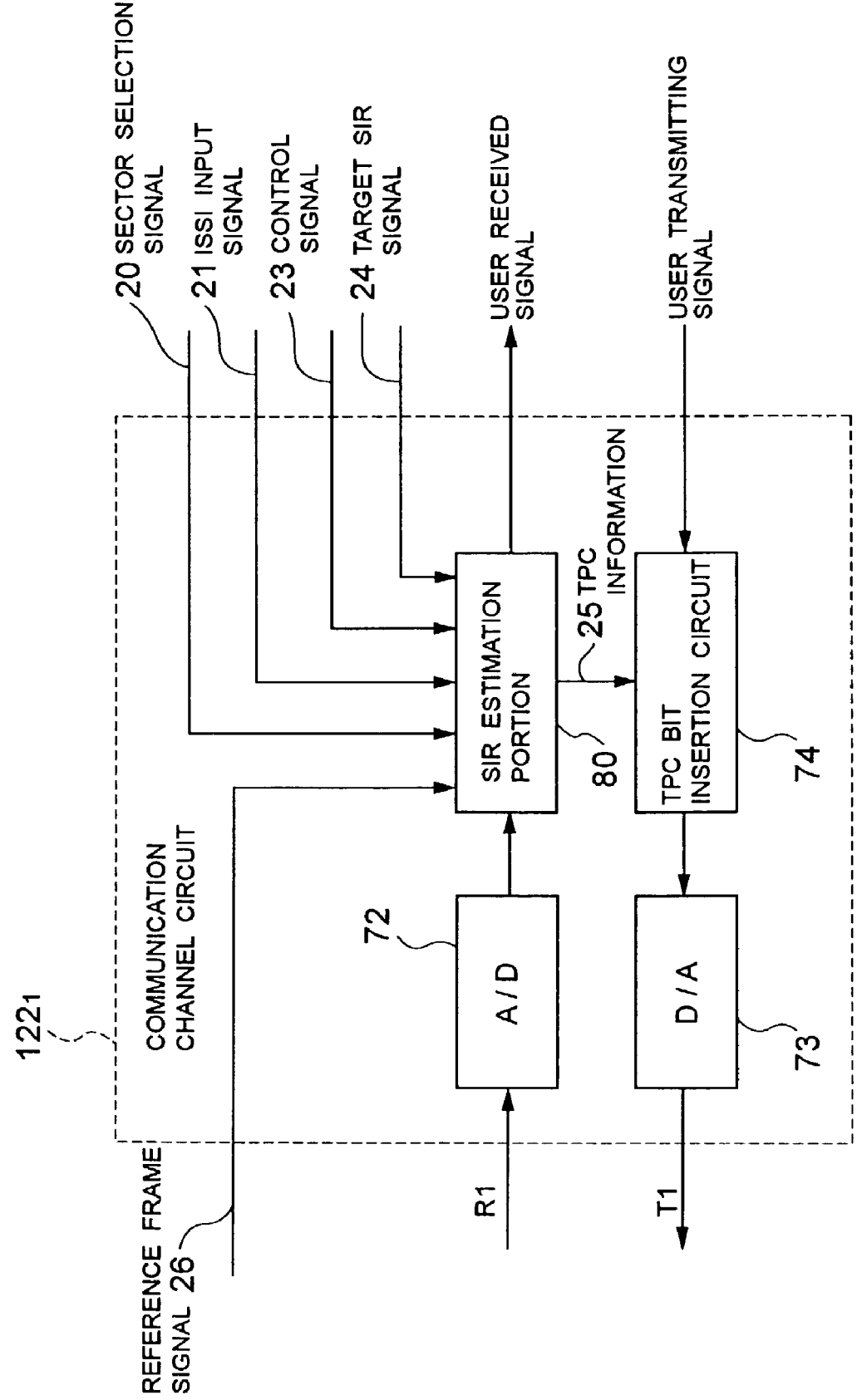
FIG. 7 is a block diagram showing a configuration of a communication channel circuit $122_1$ in FIG. 6.
Figure 8:
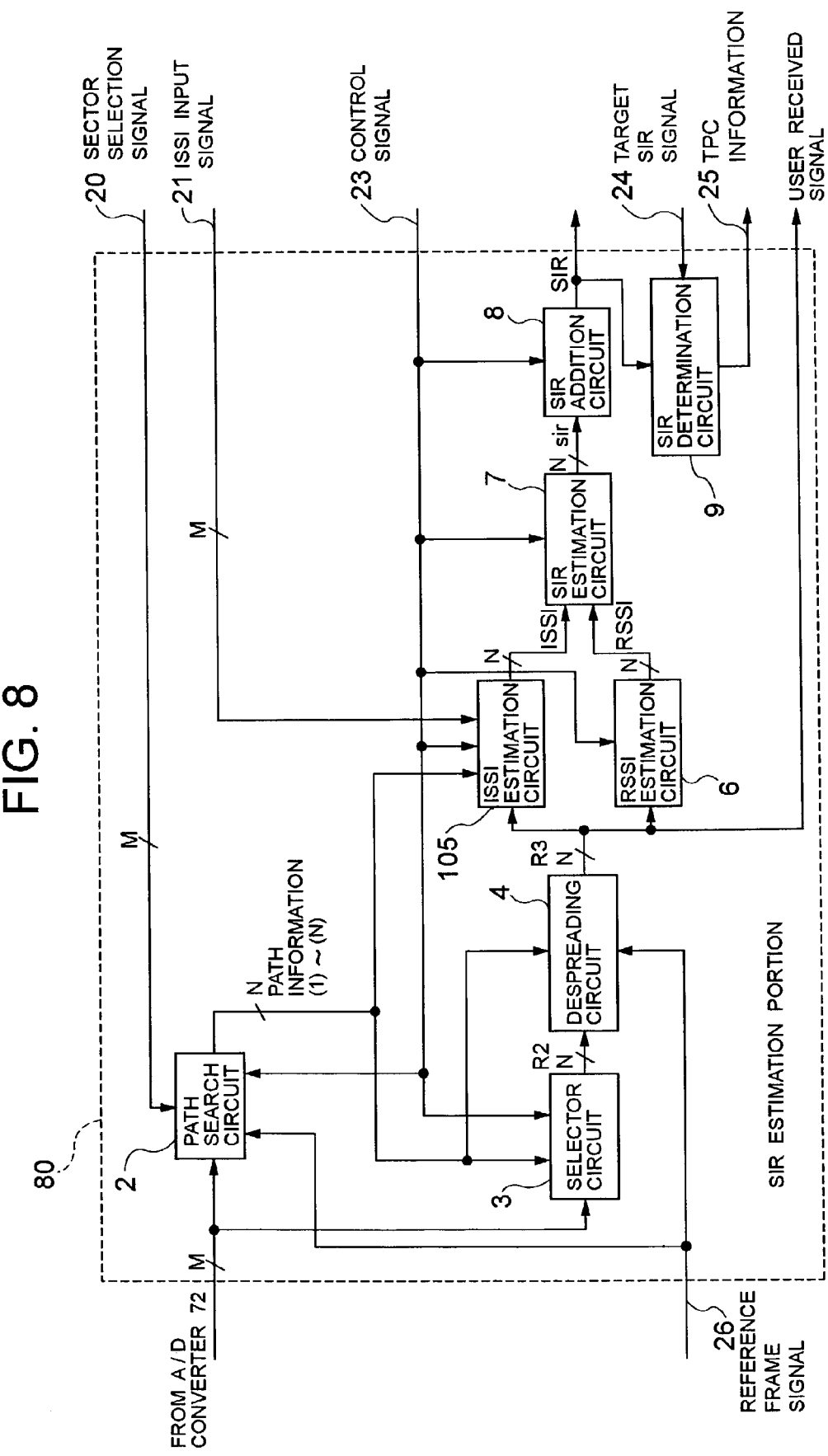
FIG. 8 is a block diagram showing a configuration of an SIR estimating portion 80 in FIG. 7.
Figure 9:
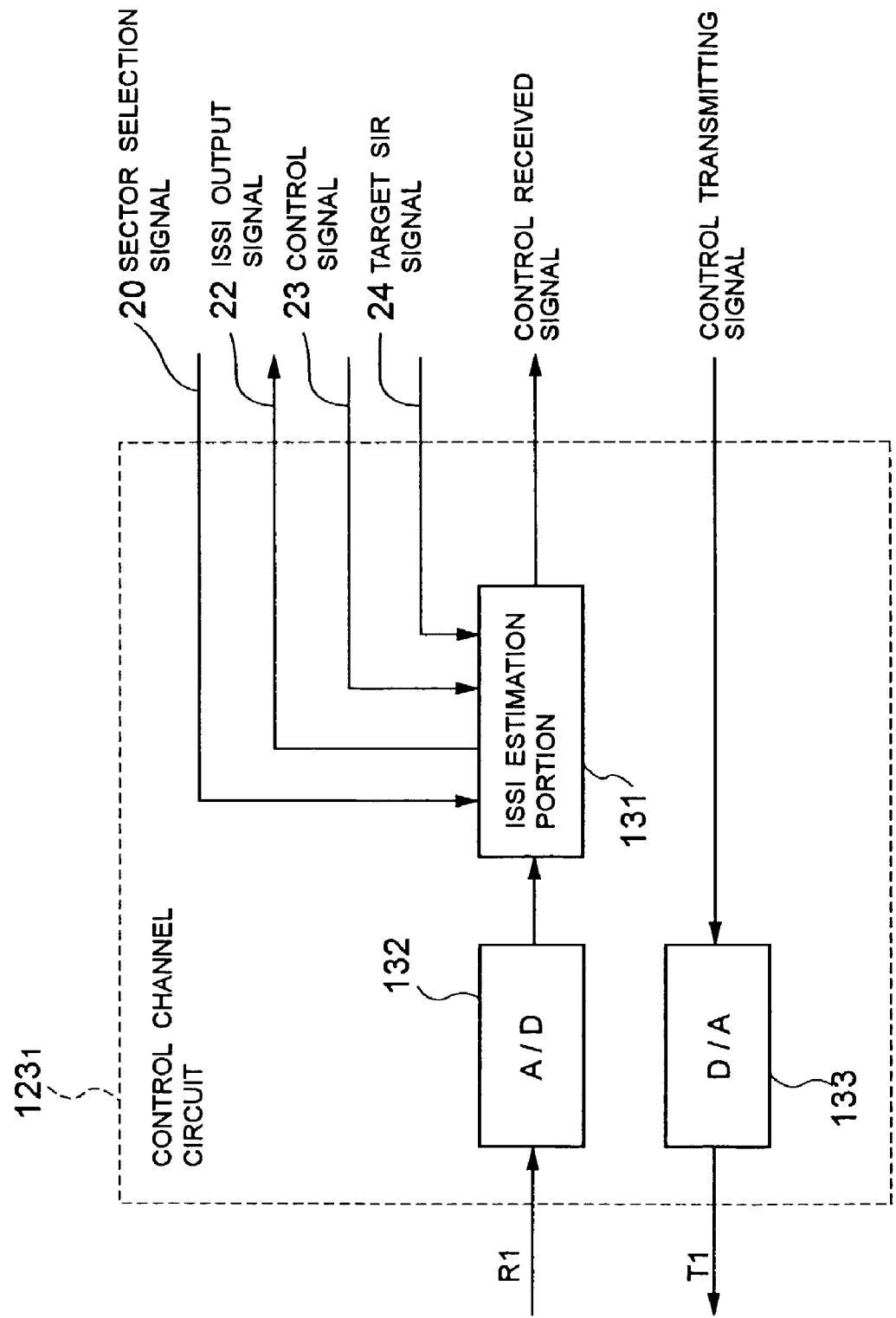
FIG. 9 is a block diagram showing a configuration of a control channel circuit $123_1$ in FIG. 6.
Figure 10:
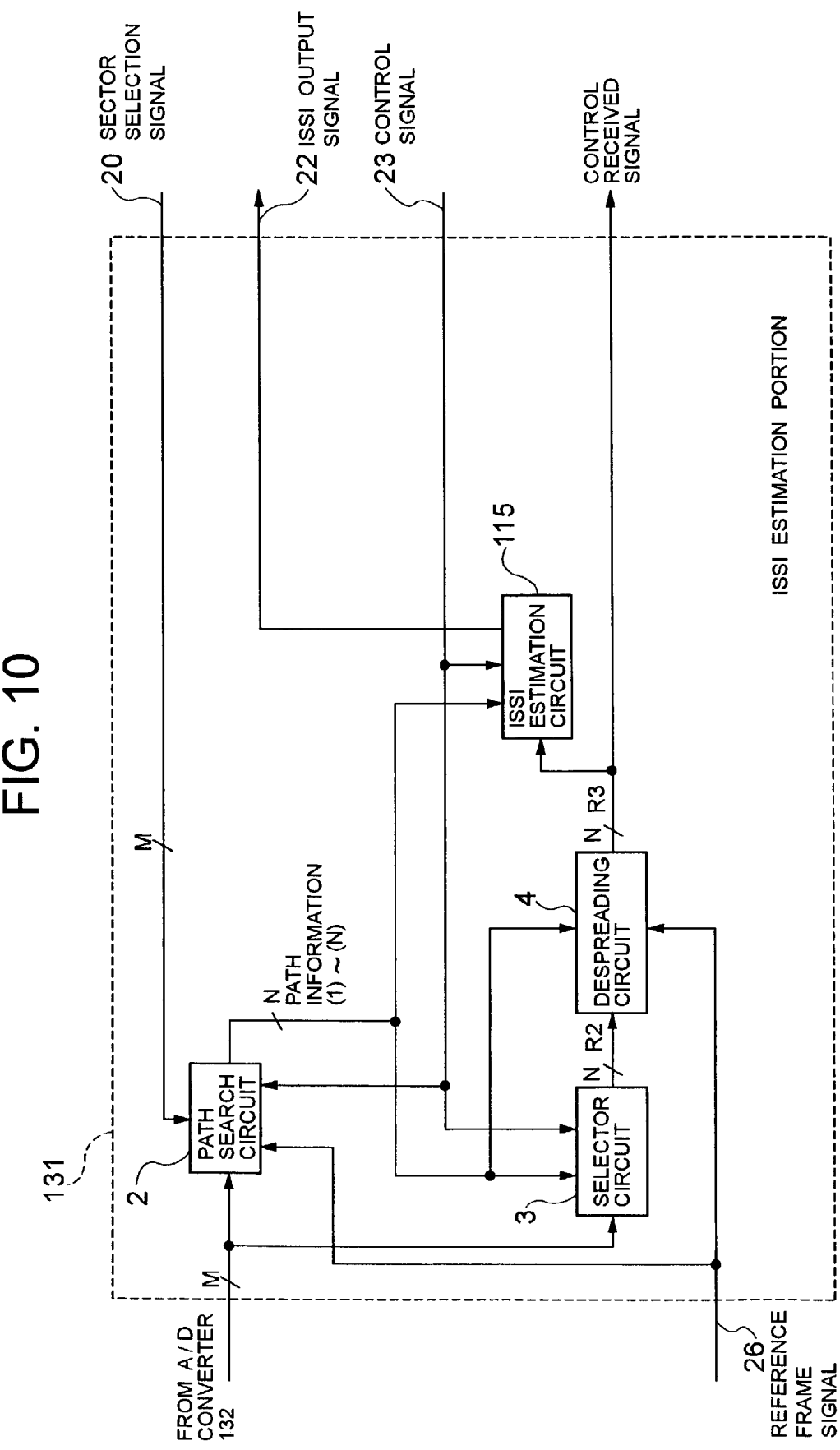
FIG. 10 is a block diagram showing a configuration of an ISSI estimating portion 131 in FIG. 9.
Figure 11:
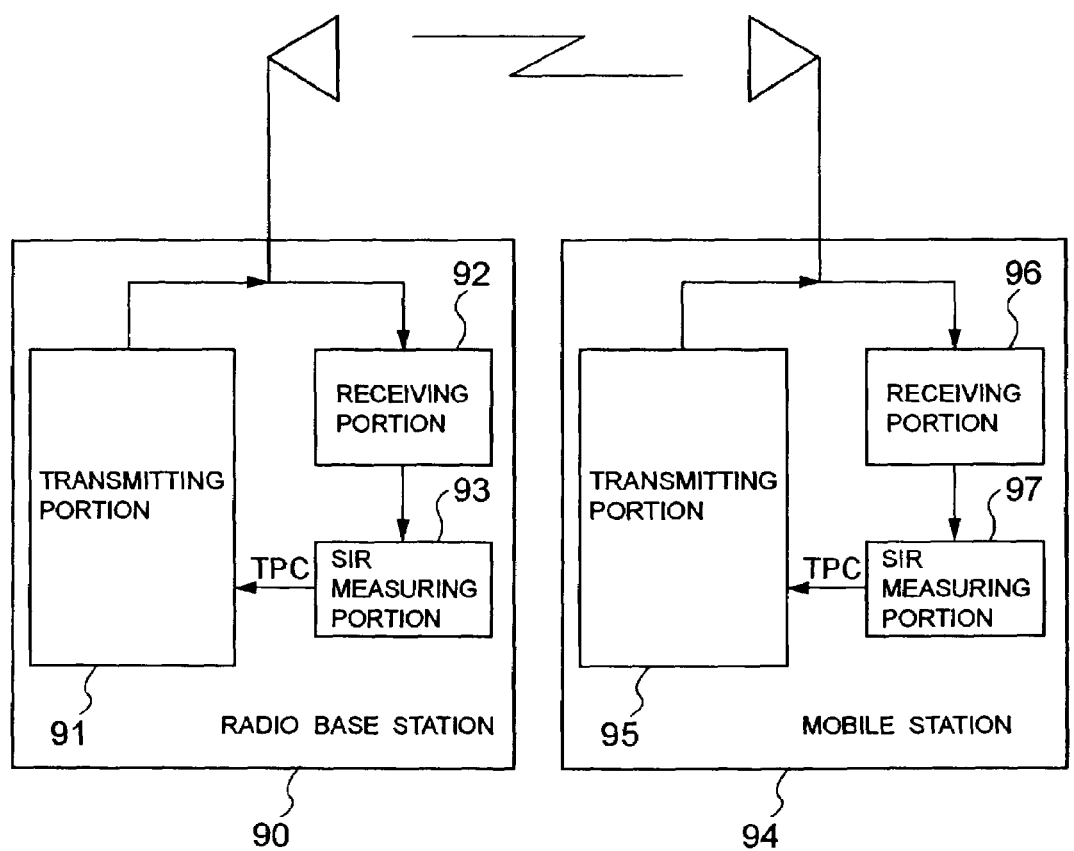
FIG. 11 is a block diagram showing a configuration of a radio base station 90 and a mobile station 94 for performing a transmission power control.

FIG. 6 is a block diagram showing a configuration of a radio base station according to the second embodiment of the present invention. In FIG. 6, the same components as those in FIG. 1 are given the same reference numerals, and description thereof will be omitted. FIG. 7 shows a configuration of a communication channel circuit 122$_1$ in FIG. 6, and FIG. 8 shows a configuration of a SIR estimating portion 80 in FIG. 7. FIG. 9 shows a configuration of a control channel circuit 123$_1$ in FIG. 6, and FIG. 10 shows a configuration of an ISSI estimating portion 131 in FIG. 9.

While the radio base station according to the first embodiment comprises the common control circuit 61 and the communication channel circuits 62$_1$ to 62$_K$, the radio base station according to the second embodiment comprises a common control circuit 112 and communication channel circuits 122$_1$ to 122$_K$, and in addition, control channel circuits 123$_1$ to 123$_L$ equal to the number of the sectors.

Each of the control channel circuits 123$_1$ to 123$_L$ is corresponding to one sector, and it is determined by the sector selection signals 20 provided from the common control circuit 121 as to which control channel circuit handles which sector. While a main object of the communication channel circuits 122$_1$ to 122$_K$ is transmitting and receiving of user data, the main object of the control channel circuits 123$_1$ to 123$_L$ is transmitting and receiving of control data transmitted and received between the station and the other station. The control data is intermittently transmitted (transmitting the signal only when there is significant data, and transmitting nothing otherwise).

The common control circuit 121 turns on all the control channel circuits 123$_1$ to 123$_L$ immediately after the start of the station so as to allow a control channel to be received in all the sectors. As the user data is generally transmitted and received after transmitting and receiving the control data, the control channel circuits 123$_1$ to 123$_L$ should immediately be turned on in this way to be capable of receiving the control data at any time, and any of the communication channel circuits 122$_1$ to 122$_K$ should be turned on at the time of detecting generation of the user data in the transmitting and receiving of the control data, if any.

In addition, the control channel has no transmission power control performed since it is a burst channel, and so no SIR measurement is necessary for the control channel circuits 123$_1$ to 123$_L$. Moreover, it is not necessary to generate the TPC information.

Each of the control channel circuits 123$_1$ to 123$_L$ periodically measures the ISSI of the sector specified by the signals 20 (corresponding sector) and stores the measured ISSI (current ISSI) in the common control circuit 121. When starting the user communication in any of the communication channel circuits 122$_1$ to 122$_K$, the communication channel circuit receives the current ISSI from the common control circuit 121, and performs the ISSI estimation by using the current ISSI value as the initial value. However, the current ISSI value is sent from each of the control channel circuits 123$_1$ to 123$_L$ to the common control circuit 121 by using the ISSI output signal 22 as mentioned above, and so no ISSI value is transmitted from each of the communication channel circuits 122$_1$ to 122$_K$ to the common control circuit 121. This is because, although the RSSI values are different between the communication channel and the control channel, the ISSI value does not depend on the kind of signal since it is the sum of the noise inputted to the antenna, interference of other users and noise generated in the station.

The SIR estimating portion 80 according to the second embodiment is the same the SIR estimating portion 71 shown in FIG. 3 except that the ISSI estimation circuit 5 is replaced by the ISSI estimation circuit 105.

As mentioned above, the current ISSI value is estimated by the control channel circuit, so that the ISSI estimation circuit 105 receives the current ISSI used as the initial value from the common control circuit 121 but does not need to return the ISSI estimated by the circuit 105. Otherwise, its operation is the same as the ISSI estimation circuit 5 in the SIR estimating portion 71. Thus, compared to the ISSI estimation circuit 5, it is not necessary to generate the ISSI output signals 22 and a processing amount is accordingly reduced.

FIG. 10 is a block diagram showing a configuration of the ISSI estimating portion 131 included in the control channel circuit 123$_1$ in FIG. 6. The ISSI estimating portion 131 is different from the SIR estimating portion 71 shown in FIG. 3 in that no SIR measurement is necessary in the control channel circuits and so the RSSI estimation circuit 6, SIR estimation circuit 7, SIR addition circuit 8 and SIR determination circuit 9 are eliminated and that the ISSI estimation circuit 5 is replaced by the ISSI estimation circuit 115. While the ISSI estimation circuit 115 performs the ISSI estimation with a preset value of zero as the initial value, there is considerable time before the user data is generated since the control channel circuit is turned on immediately after the start of the station, so that the ISSI value converges before the user data is generated even if the initial value is zero. In addition, as each control channel circuit is in charge of only one sector specified by the sector selection signals 20, only one sector selection signal 20 is "1" even though M sector selection signals 20 are inputted to each control channel circuit. Therefore, each control channel circuit outputs only one ISSI output signal 22 to the common control circuit 121.

In the radio base station according to the second embodiment, the control channel circuits $123_1$ to $123_L$ constantly monitoring all the sectors from immediately after the start of the station periodically perform the ISSI estimation, and periodically update the current ISSI values in the common control circuit 121. Therefore, even in the case where the generation frequency of the user data is low and there is a time interval between generation of certain user data and generation of the next user data, the stable transmission power control can be performed immediately after starting the user communication without being influenced by the generation frequency (frequency of the user communication). Furthermore, it is not necessary to turn on any of the communication channel circuits in order to measure the ISSI immediately after the power is turned on, so that it can prevent the sequences at the start of the station from increasing and becoming complicated.

According to the first and second embodiments, the estimated ISSI value is stored in the common control circuit, but the present invention is not limited thereto. The estimated ISSI value can be stored in storing means capable of storing the ISSI value on finishing the user communication and outputting the stored ISSI value to the communication channel circuit on starting the next user communication.

While the first and second embodiments were described by using the case where the radio base station estimates the SIR of the received signal from the mobile station to control the transmission power of the mobile station, the present invention is not limited thereto, but it is applicable likewise to the case where the mobile station estimates the SIR of the received signal from the radio base station to control the transmission power of the radio base station.

While the first and second embodiments were described by using a mobile communication system comprising the radio base station and the mobile station, the present invention is applicable likewise to a radio receiving apparatus for performing radio communication with a radio transmitting apparatus.

While the measured SIR value is used for the transmission power control in the first and second embodiments, the measured SIR value can be used for other control.

While the first embodiment was described by using the case where a plurality of communication channel circuits exist and the second embodiment was described by using the case where a plurality of communication channel circuits and control channel circuits exist, the present invention is also applicable to the case where only one each of communication channel circuit and control channel circuit exist. In particular, as only one communication channel circuit is provided in general in the mobile station, the common control circuit becomes unnecessary in the case of applying the present invention to the mobile station, so that the ISSI value on finishing the user communication is stored in the storing means provided in the communication channel circuit.

The radio base station according to each of the first and second embodiments has a record medium having recorded a program for implementing the SIR estimation method described above. This record medium may be a magnetic disk, a semiconductor memory or another record medium. This program is read from the record medium to the radio base station so as to control the operation of the radio base station. To be more specific, a CPU in the radio base station instructs hardware resources of the radio base station to perform a specific process by the control of this program so that the above process is implemented.

As described above, the present invention has the effect of performing the stable transmission power control immediately after starting the user communication.

What is claimed is:

1. A radio base station comprising:
SIR estimating means for, from a desired signal level and an interference signal level of a received signal from a mobile station, estimating an SIR (Signal to Interference power Ratio) value of the received signal; and
storing means for storing a current interference signal level of each sector of a plurality of sectors available for communications,
wherein, on starting a communication, said SIR estimating means measures the interference signal level of a sector where the communication is started by using, as an initial value, an interference signal level corresponding to the sector where the communication is started of the interference signal levels stored in said storing means, and stores in said storing means a measured interference signal level for said sector when the communication is finished.

2. The radio base station according to claim 1, wherein said SIR value measured by said SIR estimating means is used for controlling a transmission power of an uplink from said mobile station to the radio base station.

3. A radio base station comprising:
SIR estimating means for, from a desired signal level and an interference signal level of a received signal from a mobile station, estimating an SIR (Signal to Interference power Ratio) value of the received signal;
storing means for storing a current interference signal level of each sector of a plurality of sectors available for communications; and
one or more control channel circuits for periodically measuring an interference signal level of each sector and storing in said storing means the measured interference signal level of each sector,
wherein, on starting a communication, said SIR estimating means measures the interference signal level of a sector where the communication is started by using, as an initial value, an interference signal level corresponding to the sector where the communication is started of the interference signal levels stored in said storing means.

4. A mobile station comprising:
SIR estimating means for, from a desired signal level and an interference signal level of a received signal from a radio base station, estimating an SIR (Signal to Interference power Ratio) value of the received signal; and storing means for storing a current interference signal level of each sector of a plurality of sectors available for communications, wherein, on starting a communication, said SIR estimating means measures the interference signal level of a sector where the communication is started by using, as an initial value, an interference signal level corresponding to the sector where the communication is started of the interference signal levels stored in said storing means, and stores in said storing means a measured interference signal level for said sector when the communication is finished.

5. The mobile station according to claim 4, wherein said SIR value measured by said SIR estimating means is used for controlling a transmission power of a downlink from said radio base station to the mobile station.

6. A mobile station comprising:

SIR estimating means for, from a desired signal level and an interference signal level of a received signal from a radio base station, estimating an SIR (Signal to Interference power Ratio) value of the received signal;

storing means for storing a current interference signal level of each sector of a plurality of sectors available for communications; and one or more control channel circuits for periodically measuring an interference signal level of each sector and storing in said storing means the measured interference signal level of each sector, wherein, on starting a communication, said SIR estimating means measures the interference signal level of a sector where the communication is started by using, as an initial value, an interference signal level corresponding to the sector where the communication is started of the interference signal levels stored in said storing means.

7. A radio receiving apparatus comprising:

SIR estimating means for, from a desired signal level and an interference signal level of a received signal from a radio transmitting apparatus, estimating an SIR (Signal to Interference power Ratio) value of the received signal; and storing means for storing a current interference signal level of each sector of a plurality of sectors available for communications, wherein, on starting a communication, said SIR estimating means measures the interference signal level of a sector where the communication is started by using, as an initial value, an interference signal level corresponding to the sector where the communication is started of the interference signal levels stored in said storing means, and stores in said storing means a measured interference signal level of said sector when the communication is finished.

8. The radio receiving apparatus according to claim 7, wherein said SIR value measured by said SIR estimating means is used for controlling a transmission power of a radio link from said radio transmitting apparatus to said radio receiving apparatus.

9. A radio receiving apparatus comprising:

SIR estimating means for, from a desired signal level and an interference signal level of a received signal from a radio transmitting apparatus, estimating an SIR (Signal to Interference power Ratio) value of the received signal;

storing means for storing a current interference signal level of each sector of a plurality of sectors available for communications; and one or more control channel circuits for periodically measuring an interference signal level of each sector and storing in said storing means the measured interference signal level of each sector, wherein, on starting a communication, said SIR estimating means measures the interference signal level of the sector where the communication is started by using, as an initial value, the interference signal level corresponding to the sector where the communication is started of the interference signal levels stored in said storing means.

10. An SIR estimation method of a radio receiving apparatus for, from a desired signal level and an interference signal level of a received signal, estimating an SIR (Signal to Interference power Ratio) value of the received signal, said method comprising:

on a start of said radio receiving apparatus, measuring the interference signal level of each sector of a plurality of sectors available for communications and storing it in a storing means of said radio receiving apparatus;

on starting a communication, measuring the interference signal level of the sector where the communication is started by using, as an initial value, the interference signal level corresponding to the sector where the communication is started of the interference signal levels stored in said storing means, for initially estimating said SIR; and storing in said storing means the measured interference signal level for said sector when the communication is finished.

11. A transmission power controlling method, comprising:

comparing an SIR value measured by the SIR estimation method according to claim 10 to a predetermined target SIR value; and in a case where the measured SIR value is smaller than the target SIR value, instructing a radio transmitting apparatus having sent said received signal to increase a transmission power, and in a case where the measured SIR value is the target SIR value or more, instructing said radio transmitting apparatus to decrease the transmission power.

12. An SIR estimation method of a radio receiving apparatus for, from a desired signal level and an interference signal level of a received signal, estimating an SIR (Signal to Interference power Ratio) value of the received signal, said method comprising:

periodically measuring the interference signal level of each sector of a plurality of sectors available for communications and storing it in a storing means of said radio receiving apparatus: and on starting a communication, measuring the interference signal level of a sector where the communication is started by using, as an initial value, the interference signal level corresponding to the sector where the communication is started of the interference signal levels stored in said storing means, for initially estimating said SIR.

13. A signal-bearing medium tangibly embodying a program having a computer perform an SIR estimation method of a radio receiving apparatus for, from a desired signal level and an interference signal level of a received signal, estimating an SIR (Signal to Interference power Ratio) value of the received signal, having the computer:

on a start of said radio receiving apparatus, measuring the interference signal level of each sector of a plurality of sectors available for communications and storing it in a storing means of said radio receiving apparatus;

on starting a communication, measuring the interference signal level of a sector where the communication is started by using, as an initial value, the interference signal level corresponding to the sector where the communication is started of the interference signal levels stored in said storing means, for initially estimating said SIR; and storing in said storing means the measured interference signal level when the communication is finished.

14. The signal-bearing medium according to claim 13, the computer further:

comparing said measured SIR value of said received signal to a predetermined target SIR value; and in a case where said measured SIR value is smaller than the target SIR value, instructing a radio transmitting apparatus having sent said received signal to increase a transmission power, and in a case where said measured SIR value is the target SIR value or more, instructing said radio transmitting apparatus to decrease the transmission power.

15. A signal-bearing medium tangibly embodying a program having a computer perform an SIR estimation method of a radio receiving apparatus for, from a desired signal level and an interference signal level of a received signal, estimating an SIR (Signal to Interference power Ratio) value of the received signal, having the computer:

periodically measuring the interference signal level of each sector of a plurality of sectors available for communications and storing it in a storing means of said radio receiving apparatus; and on starting a communication, measuring the interference signal level of a sector where the communication is started by using, as an initial value, the interference signal level corresponding to the sector where the communication is started of the interference signal levels stored in said storing means, for initially estimating said SIR.

* * * * *